(12) United States Patent
Ikemiya

(10) Patent No.: US 12,359,865 B2
(45) Date of Patent: Jul. 15, 2025

(54) AIR COMPOSITION ADJUSTMENT DEVICE, REFRIGERATION APPARATUS FOR TRANSPORTATION, AND TRANSPORT CONTAINER

(71) Applicant: DAIKIN INDUSTRIES, LTD., Osaka (JP)

(72) Inventor: Makoto Ikemiya, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 193 days.

(21) Appl. No.: 18/083,020

(22) Filed: Dec. 16, 2022

(65) Prior Publication Data

US 2023/0118612 A1    Apr. 20, 2023

Related U.S. Application Data

(63) Continuation of application No. PCT/JP2021/023942, filed on Jun. 24, 2021.

(30) Foreign Application Priority Data

Jun. 29, 2020  (JP) ................................ 2020-111977

(51) Int. Cl.
- F25D 23/00 (2006.01)
- F25D 11/02 (2006.01)
- F25D 29/00 (2006.01)

(52) U.S. Cl.
CPC .......... *F25D 23/003* (2013.01); *F25D 11/022* (2013.01); *F25D 29/00* (2013.01)

(58) Field of Classification Search
CPC ..... A23B 7/148; F25D 11/022; F25D 17/042; F25D 23/003; F25D 17/06; F25D 11/003; A23L 3/36; A23L 3/3418

See application file for complete search history.

(56) References Cited

U.S. PATENT DOCUMENTS

| | | |
|---|---|---|
| 5,438,841 A | 8/1995 | Cahill-O'Brien et al. |
| 5,457,963 A | 10/1995 | Cahill-O'Brien et al. |

(Continued)

FOREIGN PATENT DOCUMENTS

| | | |
|---|---|---|
| JP | 4-263779 A | 9/1992 |
| JP | 8-168 A | 1/1996 |

(Continued)

OTHER PUBLICATIONS

Extended European Search Report for corresponding European Application No. 21832001.8, dated Sep. 25, 2023.

(Continued)

*Primary Examiner* — Frantz F Jules
*Assistant Examiner* — Martha Tadesse
(74) *Attorney, Agent, or Firm* — Birch, Stewart, Kolasch & Birch, LLP

(57) ABSTRACT

In an air composition adjustment device configured to adjust composition of air in a target space, an air circuit configured to supply air having adjusted composition to the target space is provided with a first passage through which outside air is introduced into an adjuster, and a second passage which is branched from the first passage and through which outside air is introduced into the sensor, and the second passage is provided with a moisture removal portion configured to remove moisture in air introduced into the sensor. This reduces a risk of a failure of the sensor due to contact of the sensor with moisture passed through the passage introducing outside air into the sensor.

16 Claims, 18 Drawing Sheets

(56) References Cited

U.S. PATENT DOCUMENTS

| | | |
|---|---|---|
| 2010/0281891 A1 | 11/2010 | Behrends et al. |
| 2012/0117816 A1 | 5/2012 | Yokohama et al. |
| 2017/0251682 A1* | 9/2017 | Kamei .................... F25D 11/00 |
| 2019/0141903 A1 | 5/2019 | Takayama et al. |
| 2021/0161075 A1 | 6/2021 | Takayama et al. |
| 2021/0263492 A1 | 8/2021 | Kamei et al. |

FOREIGN PATENT DOCUMENTS

| | | | |
|---|---|---|---|
| JP | 11-130575 A | | 5/1999 |
| JP | 2002-267338 A | | 9/2002 |
| JP | 2003222458 A | * | 8/2003 |
| JP | 2006-77531 A | | 3/2006 |
| JP | 2010-276259 A | | 12/2010 |
| JP | 2013163993 A | * | 8/2013 |
| JP | 2017-67393 A | | 4/2017 |
| JP | 2020-24081 A | | 2/2020 |
| WO | 2016/042715 A1 | | 3/2016 |
| WO | 2017/179889 A1 | | 10/2017 |
| WO | WO-2019214433 A1 * | 11/2019 | ............ B01D 46/24 |
| WO | WO 2020/100515 A1 | | 5/2020 |

OTHER PUBLICATIONS

International Search Report (PCT/ISA/210) issued in PCT/JP2021/023942, dated Aug. 3, 2021.

English translation of the International Preliminary Report on Patentability and Written Opinion of the International Searching Authority for International Application No. PCT/JP2021/023942, dated Jan. 12, 2023.

* cited by examiner

AIR COMPOSITION ADJUSTMENT DEVICE, REFRIGERATION APPARATUS FOR TRANSPORTATION, AND TRANSPORT CONTAINER

CROSS REFERENCE TO RELATED APPLICATIONS

This application is a Continuation of PCT International Application No. PCT/JP2021/023942, filed on Jun. 24, 2021, which claims priority under 35 U.S.C. 119(a) to Patent Application No. 2020-111977, filed in Japan on Jun. 29, 2020, all of which are hereby expressly incorporated by reference into the present application.

TECHNICAL FIELD

The present disclosure relates to an air composition adjustment device, a refrigeration apparatus for transport, and a transport container.

BACKGROUND ART

For example, in a known air composition adjustment device which controls the oxygen concentration and the carbon dioxide concentration in an internal space of a transport container which transports fresh items, a sensor of measuring composition of air is used (e.g., see Patent Document 1). In the air composition adjustment device, if a measurement value from the sensor deviates from the actual value, the concentrations of oxygen and carbon dioxide in the internal space cannot be controlled to desired concentrations, which may deteriorate the fresh items in the internal space. Therefore, in this type of the air composition adjustment device, the sensor is provided with a passage into which outside air is introduced, and is calibrated periodically or irregularly by introducing outside air to the sensor.

CITATION LIST

Patent Document

Patent Document 1: Japanese Unexamined Patent Publication No. H08-000168

SUMMARY

A first aspect of the present disclosure is directed to an air composition adjustment device including: a conveying unit (31) configured to convey air; an adjuster (34, 35) configured to adjust composition of the air; an air circuit (3) configured to introduce the air into the adjuster (34, 35) by the conveying unit (31) and supply the air having adjusted composition to a target space; and a sensor (51) disposed in the target space and configured to measure the composition of the air.

DESCRIPTION OF EMBODIMENT

First Embodiment

Figure 1:
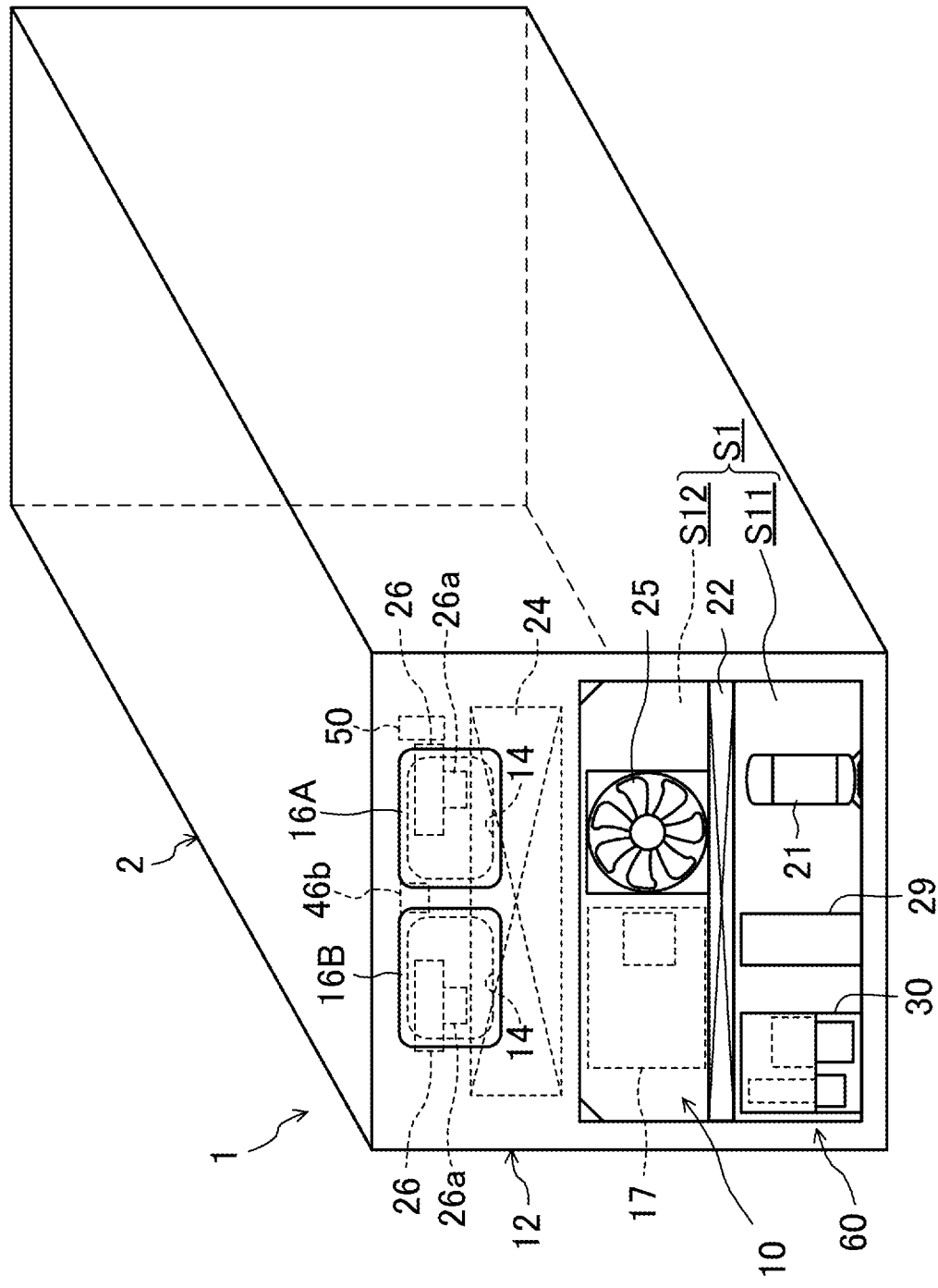
FIG. 1 is a perspective view of a refrigeration apparatus for transport according to a first embodiment of the present invention as viewed from outside.

A first embodiment of the present invention will now be described in detail with reference to the drawings.

<General Configuration>

The present embodiment relates to a transport container (1) including an air composition adjustment device (60) configured to adjust composition of air in a target space. The air composition adjustment device (60) includes a gas supply unit (30) and a sensor unit (50). The gas supply unit (30) includes a conveying unit (an air pump (31) to be described later) configured to convey air, an adjuster (first and second adsorption columns (34, 35) to be described later) configured to adjust composition of air, and an air circuit (3) configured to introduce the air into the adjuster by the conveying unit and supply the air that has adjusted composition to a target space. The sensor unit (50) includes sensors (51, 52) disposed in the target space to measure the composition of air.

<Transport Container>

Figure 2:
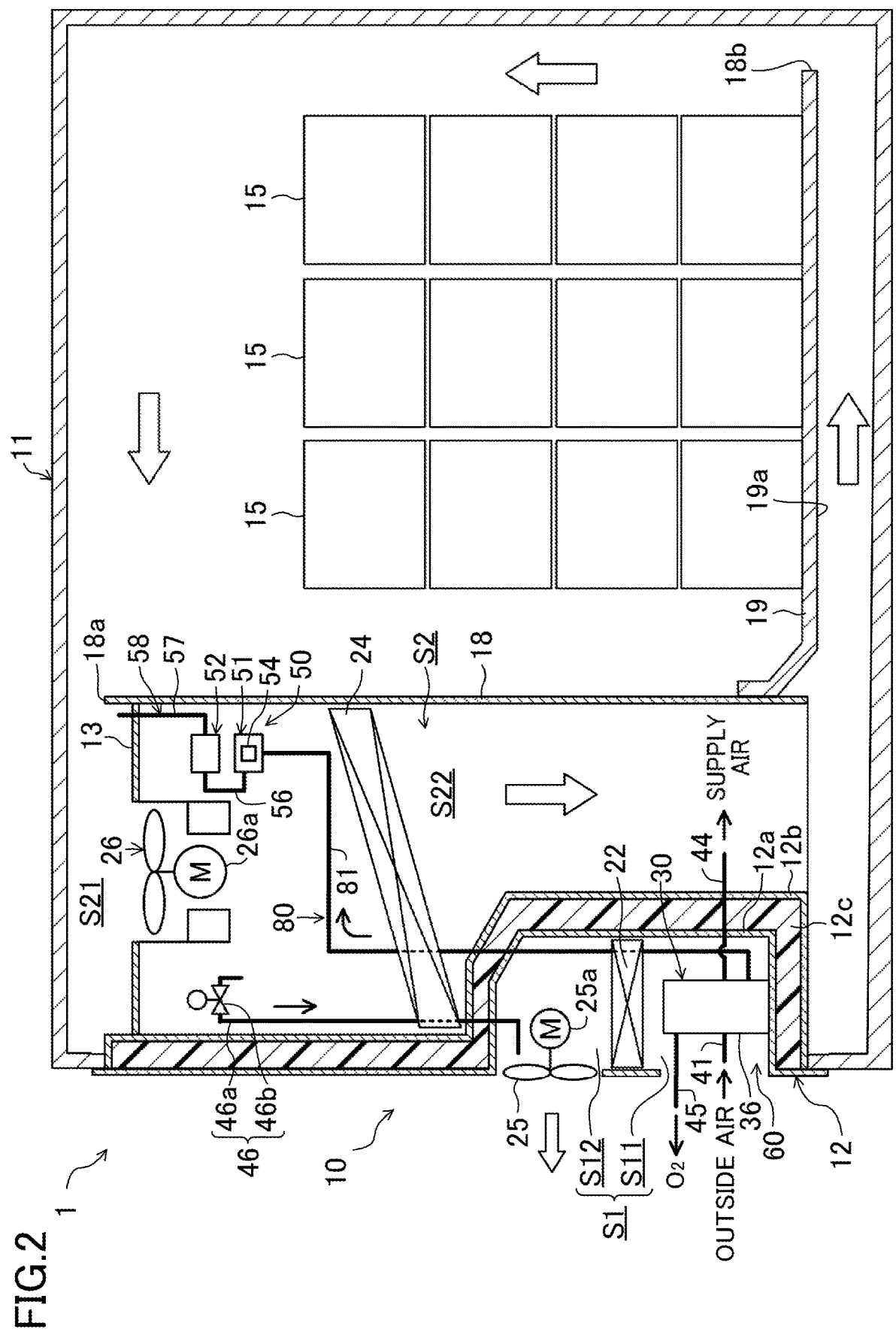
FIG. 2 is a sectional side view of a general configuration of the refrigeration apparatus for transport of FIG. 1.

As illustrated in FIGS. 1 and 2, a transport container (1) includes a container body (2) and a refrigeration apparatus (10) for transport, and is used for marine transport and the like. The refrigeration apparatus (10) for transport cools air in the container body (2) (target space). In an internal space (target space) of the container body (2), boxed fresh items (plants (15)) are stored. Examples of the plants (15) include garden stuff such as bananas and avocados, vegetables, cereals, bulbous plants, and natural flowers, and the plants (15) breathe by intake of oxygen ($O_2$) in the air and releasing carbon dioxide ($CO_2$) into the air.

The container body (2) has a shape of an elongated rectangular parallelepiped box with an open end surface. The refrigeration apparatus (10) for transport includes a casing (12), a refrigerant circuit (20), and a CA system (air composition adjustment device/controlled atmosphere system) (60). The casing (12) of the refrigeration apparatus (10) for transport is attached to block the open end of the container body (2).

<Refrigeration Apparatus for Transport>

The refrigeration apparatus (10) for transport includes a refrigerant circuit (20) configured to perform a refrigeration cycle, and cools inside air of the container body (2) by an evaporator (24) of the refrigerant circuit (20).

<Casing>

As illustrated in FIG. 2, the casing (12) of the refrigeration apparatus (10) for transport includes an exterior wall (12a) disposed outside the container body (2), and an interior wall (12b) disposed inside the container body (2). The exterior wall (12a) and the interior wall (12b) are made of, for example, an aluminum alloy.

The exterior wall (12a) is attached to the peripheral portion of the opening of the container body (2) so as to block the open end of the container body (2). The exterior wall (12a) has a lower portion protruding into the container body (2).

The interior wall (12b) is disposed to face the exterior wall (12a). The interior wall (12b) protrudes into the container just like the lower portion of the exterior wall (12a). A thermal insulator (12c) fills the space between the interior wall (12b) and the exterior wall (12a).

As can be seen, the lower portion of the casing (12) is formed so as to protrude into the container body (2). Thus, an external storage space (S1) is formed outside the container body (2) and in the lower portion of the casing (12), and an internal storage space (S2) is formed inside the container body (2) and in the upper portion of the casing (12).

As illustrated in FIG. 1, the casing (12) includes two access openings (14) for maintenance arranged side by side in a width direction of the casing (12). The two access openings (14) are closed respectively by first and second access doors (16A, 16B) which are openable and closable.

As illustrated in FIG. 2, a partition plate (18) is disposed in the container body (2). This partition plate (18) is configured as a substantially rectangular plate member, and is spaced apart from, and faces, the inner surface of the casing (12). This partition plate (18) separates the internal storage space (S2) from the internal space (target space) of the container body (2) where the plants (15) are stored.

A suction port (18a) is formed between the upper end of the partition plate (18) and a ceiling surface of the container body (2). Inside air in the container body (2) is taken into the internal storage space (S2) through the suction port (18a).

The internal storage space (S2) is further provided with a partition wall (13) extending in the horizontal direction. The partition wall (13) is attached to an upper end portion of the partition plate (18), and has an opening in which internal fans (26), which will be described later, are disposed. This partition wall (13) partitions the internal storage space (S2) into a primary space (S21) on the suction side of the internal fans (26), and a secondary space (S22) on the blowout side of the internal fans (26). In this embodiment, the primary space (S21) is disposed on an upper side, and the secondary space (S22) is disposed on a lower side.

A floorboard (19) on which boxed plants (15) are placed is provided above the bottom of the container body (2) in the container body (2). An underfloor path (19a) is formed between the floorboard (19) and the bottom surface of the container body (2). A gap is left between the lower end of the partition plate (18) and the bottom surface in the container body (2), and the internal storage space (S2) communicates with the underfloor path (19a).

A blowout port (18b) is provided at an end of the floorboard (19) opposite from the container body (2) (on the right side in FIG. 2). Through the blowout port (18b), the air which has been cooled by the refrigeration apparatus (10) for transport is blown into the container body (2).

<Configuration of Refrigerant Circuit and Arrangement of Components>

Figure 3:
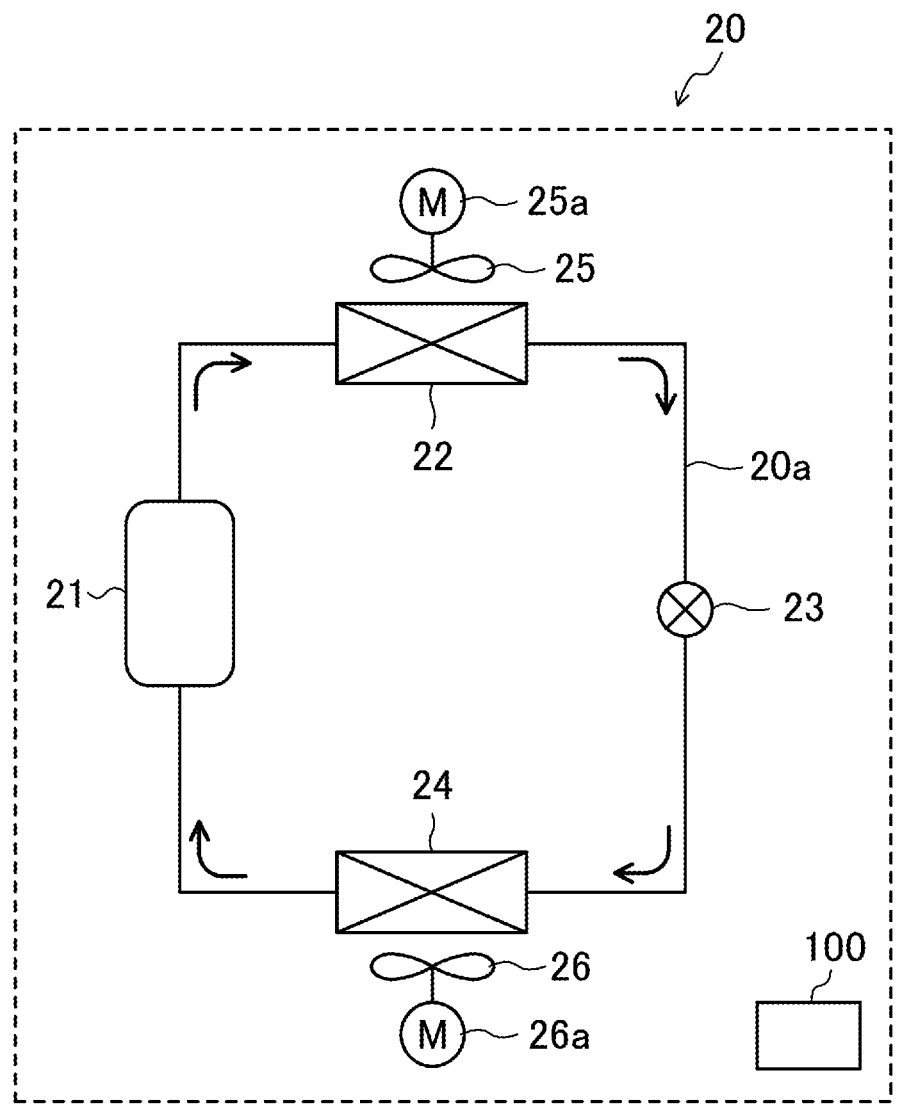
FIG. 3 is a piping system diagram illustrating a configuration of a refrigerant circuit of the refrigeration apparatus for transport of FIG. 1.

As illustrated in FIG. 3, the refrigerant circuit (20) is a closed circuit in which a compressor (21), a condenser (22), an expansion valve (23), and an evaporator (24) are connected together in this order by a refrigerant pipe (20a).

In the vicinity of the condenser (22), an external fan (25) is provided. The external fan (25) is driven in rotation by an external fan motor (25a), and sends air (outside air) in the external space of the container body (2) to the condenser (22). In the condenser (22), heat is exchanged between a refrigerant compressed in the compressor (21) and flowing through the condenser (22) and the outside air sent to the condenser (22) by the external fan (25).

Two internal fans (26) are provided in the vicinity of the evaporator (24). Each internal fan (26) is driven in rotation by an internal fan motor (26a), sucks inside air into the container body (2) from a suction port (18a), and blows the air to the evaporator (24). In the evaporator (24), heat is exchanged between a refrigerant having a pressure dropped by the expansion valve (23) and flowing through the evaporator (24) and the inside air sent to the evaporator (24) by the internal fans (26).

As illustrated in FIG. 1, the compressor (21) and the condenser (22) are housed in the external storage space (S1). The condenser (22) is located in the middle of the external storage space (S1) in the vertical direction, and divides the external storage space (S1) into a lower first space (S11) and an upper second space (S12). In the first space (S11), the compressor (21), an inverter box (29) which houses a driver circuit for driving the compressor (21) at a variable velocity, and a gas supply unit (30) of the CA system (60) are disposed. The external fan (25) and an electric component box (17) are disposed in the second space (S12).

As illustrated in FIG. 2, the evaporator (24) is housed in the secondary space (S22) of the internal storage space (S2). Two internal fans (26) adjacent to each other in a width direction of the casing (12) are disposed above the evaporator (24) in the internal storage space (S2) (see FIG. 1).

<Air Composition Adjustment Device>

As illustrated in FIGS. 4 to 7, the CA system (60) provided for the container body (2) includes a gas supply unit (30), an exhaust portion (46), a sensor unit (50), and a control unit (55), and controls the oxygen concentration and the carbon dioxide concentration of the inside air in the container body (2). The term "concentration" to be used in the following description always indicates a "volumetric concentration."

<Gas Supply Unit>

The gas supply unit (30) is a unit configured to generate component-controlled air to be supplied to the interior of the container body (2). In this embodiment, the gas supply unit (30) is an unit configured to produce nitrogen-enriched air having a low oxygen concentration, to be supplied to the inside of the container body (2). In this embodiment, the gas supply unit (30) is comprised of vacuum pressure swing adsorption (VPSA). As illustrated in FIG. 1, the gas supply unit (30) is disposed at the lower left corner of the external storage space (S1).

Figure 4:
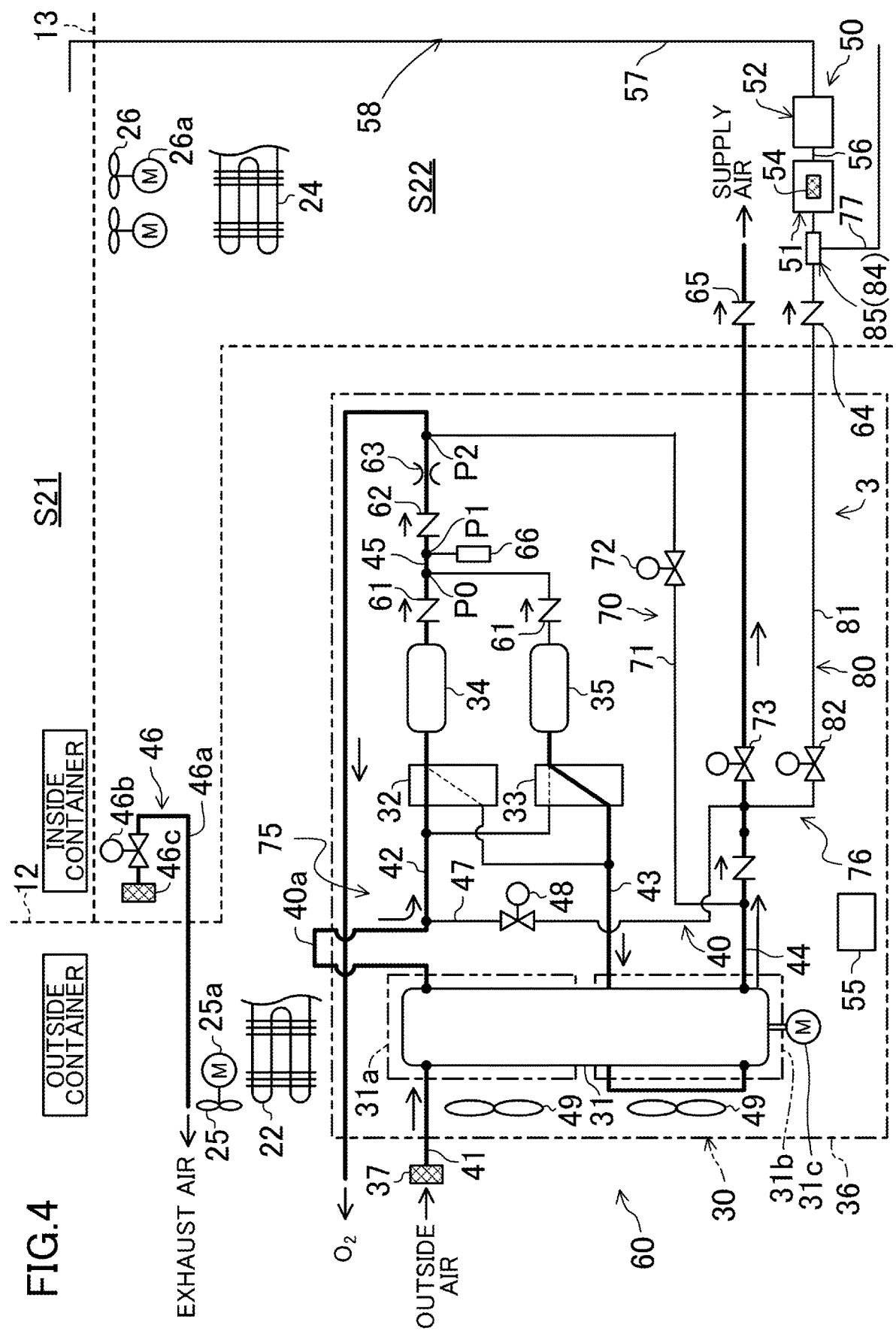
FIG. 4 is a piping system diagram illustrating an air circuit of a CA system of the refrigeration apparatus for transport of FIG. 1, which illustrates a flow of air during a first operation.

As illustrated in FIG. 4, the gas supply unit (30) includes an air circuit (3) connecting together an air pump (31), first and second directional control valves (32) and (33), and first and second adsorption columns (34) and (35) each provided with an adsorbent for adsorbing a nitrogen component in the air. The components of the air circuit (3) are housed in an unit case (36).

(Air Pump)

The air pump (31) includes a first pump mechanism (pressurizing pump mechanism) (31a) and a second pump mechanism (depressurizing pump mechanism) (31b), each of which sucks and compresses air and discharges the compressed air. The first pump mechanism (31a) and the second pump mechanism (31b) are connected to a drive shaft of a motor (31c).

(Air Circuit)

The air circuit (3) connecting together components such as the air pump (31) includes an outside air passage (41), a pressurization passage (42), a depressurization passage (43), and a supply passage (44).

One end of the outside air passage (41) which passes through the unit case (36) from the inside to the outside of the unit case (36) is connected to a suction port of the first pump mechanism (31a). An air-permeable, waterproof membrane filter (37) is provided at the other end of the outside air passage (41). Although not shown in the drawings, the other end of the outside air passage (41) where the membrane filter (37) is provided is arranged in the second space (S12) of the external storage space (S1) above the condenser (22).

The one end of the pressurization passage (42) is connected to a discharge port of the first pump mechanism (31a). The other end of the pressurization passage (42) is divided into two branches, which are connected to the first and second directional control valves (32) and (33), respectively.

A suction port of the second pump mechanism (31b) is connected to one end of the depressurization passage (43). The other end of the depressurization passage (43) is divided into two branches, which are connected to the first and second directional control valves (32) and (33), respectively. A discharge port of the second pump mechanism (31b) is connected to one end of the supply passage (44). The other end of the supply passage (44) opens in the secondary space (S22) on the blowout side of the internal fans (26) in the internal storage space (S2) of the container body (2). The supply passage (44) is provided with a check valve (65) at the other end portion thereof. The check valve (65) allows the air to flow toward the internal storage space (S2) and prevents backflow of the air.

Two blower fans (49) are disposed on the lateral side of the air pump (31) to cool the air pump (31) by blowing air toward the air pump (31).

The first pump mechanism (31a), which serves as a pressurizing pump mechanism, performs an adsorption operation in which a nitrogen component in compressed air is adsorbed on an adsorbent in one adsorption column (34, 35) by supplying the compressed air to the adsorption column (34, 35). The second pump mechanism (31b), which serves as a depressurizing pump mechanism, performs a desorption operation (an operation of producing nitrogen-enriched air) in which the nitrogen component adsorbed on the adsorbent in the other adsorption column (34, 35) is desorbed by sucking air from the adsorption column (34) and (35).

The supply passage (44) is a passage where the adsorption operation and the desorption operation are performed alternately in the adsorption columns (34, 35) and nitrogen-enriched air produced during the desorption operation is supplied to the inside of the container body (2).

An outlet portion (a portion between the pressurizing pump mechanism (31a) and the directional control valves (32, 33)) of the pressurizing pump mechanism (31a) in the pressurization passage (42) and an outlet portion of the depressurizing pump mechanism (31b) in the supply passage (44) are connected to each other by a bypass passage (47). The bypass passage (47) is provided with a bypass on-off valve (48), an opening/closing operation of which is controlled by the control unit (55).

An outside air introduction passage (40) is comprised of the outside air passage (41), a portion of the pressurization passage (42), the bypass passage (47) having a bypass on-off valve (48), and a portion of the supply passage (44). The outside air introduction passage (40) supplies compressed air (air having the same composition as outside air) which has passed through the pressurizing pump mechanism (31a) to the inside of the container. The outside air introduction passage (40) is provided with a cooling portion (40a) which passes through a space outside the unit case (36).

(Directional Control Valve)

The first and second directional control valves (32) and (33) are provided for the air circuit (3), and arranged between the air pump (31) and the first and second adsorption columns (34, 35). The first and second directional control valves (32) and (33) switch the connection state of the air pump (31) and the first and second adsorption columns (34, 35) between the two connection states (first and second connection states), which will be described later. The control unit (55) controls the switching.

The first directional control valve (32) is connected to the pressurization passage (42) connected to the discharge port of the first pump mechanism (31a), the depressurization passage (43) connected to the suction port of the second pump mechanism (31b), and one end portion of the first adsorption column (34) (functioning as an inflow port during pressurization). The first directional control valve (32) switches between the first state where the first adsorption column (34) is allowed to communicate with the discharge port of the first pump mechanism (31a) to be blocked from the inlet of the second pump mechanism (31b) (the state shown in FIG. 4), and the second state where the first adsorption column (34) is allowed to communicate with the suction port of the second pump mechanism (31b) to be blocked from the discharge port of the first pump mechanism (31a) (the state shown in FIG. 5).

The second directional control valve (33) is connected to the pressurization passage (42) connected to the discharge port of the first pump mechanism (31a), the depressurization passage (43) connected to the suction port of the second pump mechanism (31b), and one end portion of the second adsorption column (35). The second directional control valve (33) switches between the first state where the second adsorption column (35) is allowed to communicate with the suction port of the second pump mechanism (31b) to be blocked from the discharge port of the first pump mechanism (31a) (the state shown in FIG. 4), and the second state where the second adsorption column (35) is allowed to communicate with the discharge port of the first pump mechanism (31a) to be blocked from the suction port of the second pump mechanism (31b) (the state shown in FIG. 5).

If the first and second directional control valves (32) and (33) are set to be in the first state, the air circuit (3) is switched to a first connection state (see FIG. 4). In the first connection state, the discharge port of the first pump mechanism (31a) is connected to the first adsorption column (34), and the suction port of the second pump mechanism (31b) is connected to the second adsorption column (35). In this state, an adsorption operation is performed on the first adsorption column (34) to adsorb a nitrogen component in the outside air onto the adsorbent, and a desorption operation is performed on the second adsorption column (35) to desorb the nitrogen component adsorbed onto the adsorbent.

Figure 5:
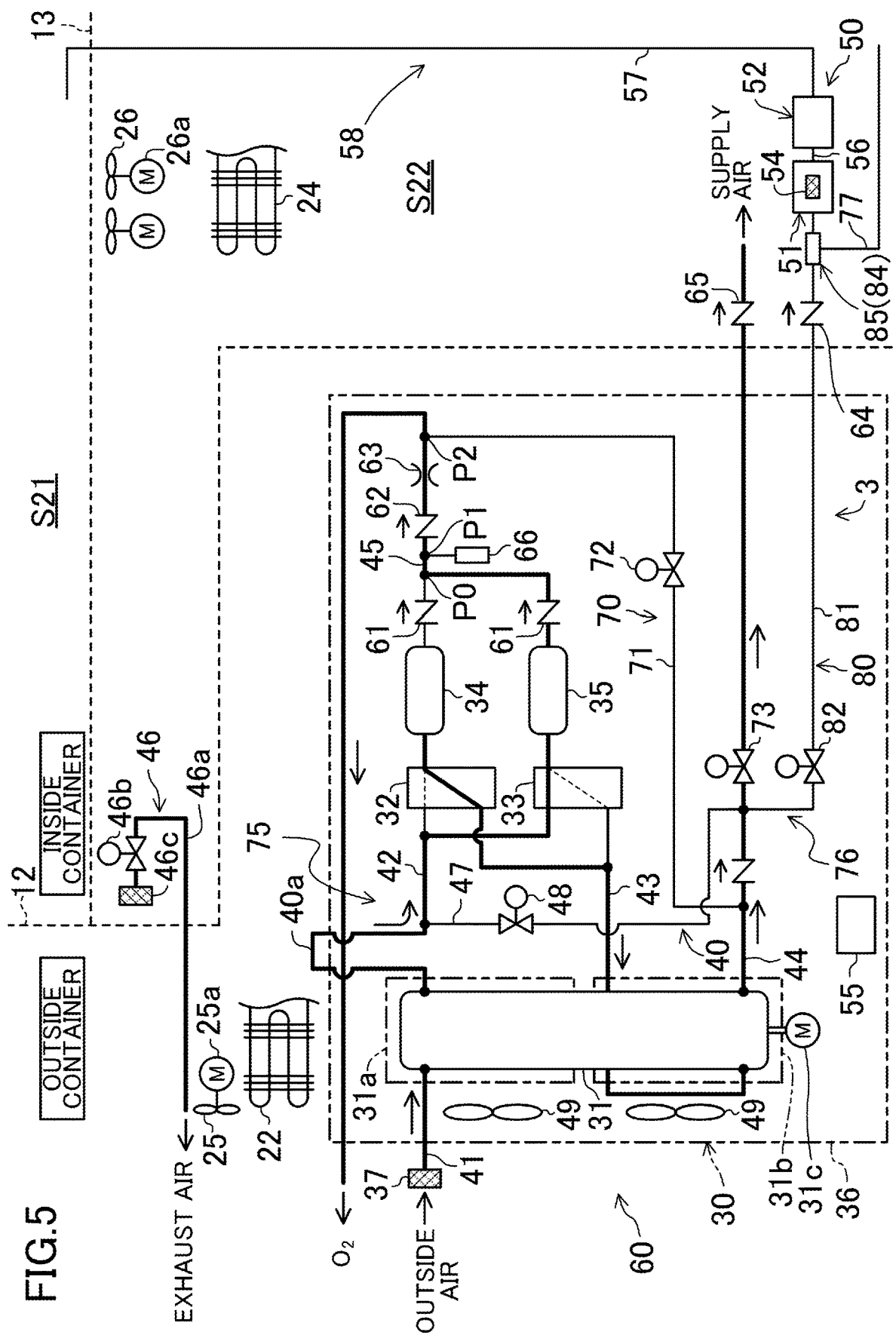
FIG. 5 is a piping system diagram illustrating an air circuit of a CA system of the refrigeration apparatus for transport of FIG. 1, which illustrates a flow of air during a second operation.
Figure 6:
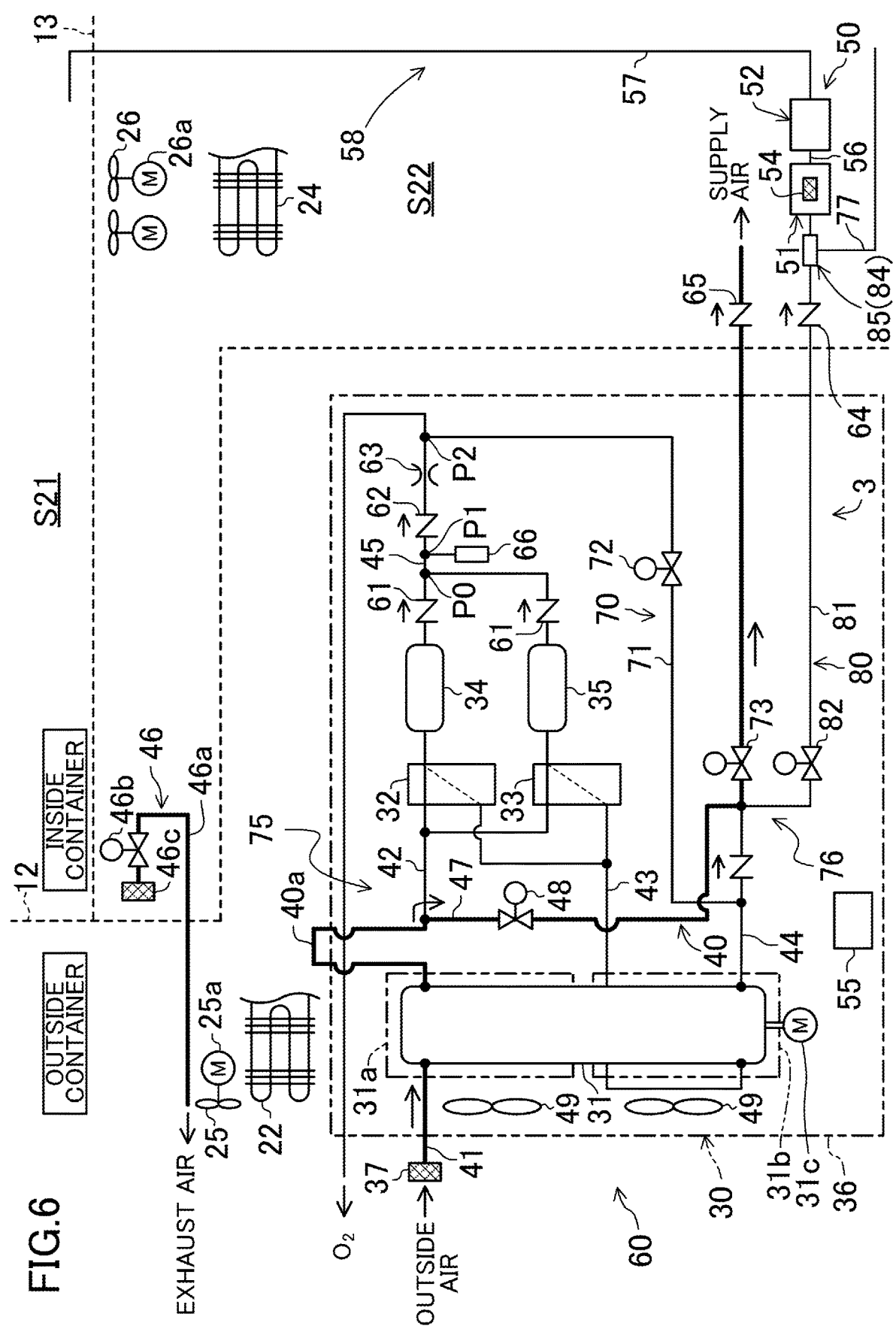
FIG. 6 is a piping system diagram illustrating an air circuit of a CA system of the refrigeration apparatus for transport of FIG. 1, which illustrates a flow of air during an outside air introduction operation.

If the first and second directional control valves (32) and (33) are both set to be in the second state, the air circuit (3) is switched to a second connection state (see FIG. 5). In the second connection state, the discharge port of the first pump mechanism (31a) is connected to the second adsorption column (35), and the suction port of the second pump mechanism (31b) is connected to the first adsorption column (34). In this state, the adsorption operation is performed on the second adsorption column (35), and the desorption operation is performed on the first adsorption column (34).

(Adsorption Column)

The first and second adsorption columns (34) and (35) are configured as cylindrical members filled with an adsorbent. The adsorbent that fills the first and second adsorption columns (34) and (35) adsorbs a nitrogen component in a state where the adsorption columns (34) and (35) are pressurized, and desorbs the nitrogen component in a state where these adsorption columns (34) and (35) are depressurized.

The adsorbent that fills the first and second adsorption columns (34) and (35) is porous zeolite having pores with a diameter smaller than the diameter of nitrogen molecules (3.0 angstrom) and larger than the diameter of oxygen molecules (2.8 angstrom), for example. The nitrogen component in the air may be adsorbed using zeolite having pores of such a diameter as the adsorbent.

If the air pump (31) supplies the compressed outside air to the first and second adsorption columns (34) and (35) to pressurize these columns (34) and (35), the nitrogen component in the outside air is adsorbed onto the adsorbent. This produces oxygen-enriched air that has had its nitrogen concentration lowered and oxygen concentration increased by including less nitrogen component than the outside air does. On the other hand, if the air pump (31) sucks the air from the first and second adsorption columns (34) and (35) to depressurize these columns (34) and (35), the nitrogen component adsorbed onto the adsorbent is desorbed. This produces nitrogen-enriched air that has had its nitrogen concentration increased and oxygen concentration lowered by including more nitrogen component than the outside air does. In this embodiment, for example, nitrogen-enriched air having a component ratio of 92% of the nitrogen concentration and 8% of the oxygen concentration is produced.

The respective other end portions of the first and second adsorption columns (34) and (35) (functioning as outflow ports during pressurization) are connected to one end of an oxygen discharge passage (45) through which the oxygen-enriched air that has been produced from the compressed outside air is guided toward the outside of the container body (2). The one end of the oxygen discharge passage (45) is divided into two branches, which are connected to the other end portions of the first and second adsorption columns (34) and (35), respectively. The other end of the oxygen discharge passage (45) opens outside the gas supply unit (30), i.e., outside the container body (2). The branch portions of the oxygen discharge passage (45) are connected to the first and second adsorption columns (34) and (35), respectively. Each of the junction portions is provided with a check valve (61) which prevents backflow of the air from the oxygen discharge passage (45) toward the first and second adsorption columns (34) and (35).

A check valve (62) and an orifice (63) are arranged at some midpoints of the oxygen discharge passage (45) from one end to the other end thereof. The check valve (62) prevents backflow of the nitrogen-enriched air from an exhaust connection passage (71), which will be described later, toward the first and second adsorption columns (34) and (35). The orifice (63) decompresses the oxygen-enriched air which has flowed out of the first and second adsorption columns (34) and (35) before the oxygen-enriched air is discharged to the outside of the container.

The oxygen discharge passage (45) through which oxygen-enriched air is discharged to the outside from the adsorption columns (34, 35) is provided with a pressure sensor (66). The pressure sensor (66) is arranged between a confluence (P0) between the first and second adsorption columns (34) and (35) and the check valve (62).

A exhaust connection passage (71) connects the discharge port of the depressurizing pump mechanism (31b) to the oxygen discharge passage (45) on the downstream side of the pressure sensor (66). The check valve (62) is provided between a first connecting point (P1) where the pressure sensor (66) and the oxygen discharge passage (45) are connected to each other, and a second connecting point (P2) where the oxygen discharge passage (45) and the exhaust connection passage (71) are connected to each other. The check valve (62) allows air to flow from the first connecting point (P1) to the second connecting point (P2) and disallows the air to flow in the reverse direction.

(Supply-Discharge Switching Mechanism)

The air circuit (3) is provided with a supply-discharge switching mechanism (70) for switching between a gas supply operation and a gas discharge operation. The gas supply operation is an operation in which nitrogen-enriched air is supplied from the first and second adsorption columns (34) and (35) to the inside of the container body (2). The gas discharge operation is an operation in which nitrogen-enriched air is discharged from the first and second adsorption columns (34) and (35) to the outside of the container. The supply-discharge switching mechanism (70) includes an exhaust connection passage (71), an exhaust on-off valve (72), and a supply on-off valve (73).

The exhaust connection passage (71) has one end connected to the supply passage (44), and the other end connected to the oxygen discharge passage (45). The other end of the exhaust connection passage (71) is connected to the oxygen discharge passage (45) so as to be located further toward the outside of the container than the orifice (63).

The exhaust on-off valve (72) is provided for the exhaust connection passage (71). The exhaust on-off valve (72) is an electromagnetic valve in an intermediate portion of the exhaust connection passage (71). The exhaust on-off valve (72) switches between an open state where the flow of the nitrogen-enriched air flowing from the supply passage (44) is allowed, and a closed state where the flow of the nitrogen-enriched air is blocked. The control unit (55) controls an opening/closing operation of the exhaust on-off valve (72).

The supply on-off valve (73) is provided for the supply passage (44) so as to be located further toward the inside of the container than the junction where the supply passage (44) and the exhaust connection passage (71) are connected to each other. The supply on-off valve (73) is an electromagnetic valve which switches between an open state where the flow of air in the container is allowed, and a closed state where the flow of the air in the container is blocked. The control unit (55) controls an opening/closing operation of the supply on-off valve (73).

<Exhaust Portion>

As illustrated in FIGS. 2 and 4, the exhaust portion (46) includes an exhaust passage (46a) connecting the internal storage space (S2) and the external space of the container together, an exhaust valve (46b) connected to the exhaust passage (46a), and a membrane filter (46c) provided at the inlet end (toward the inside of the container) of the exhaust passage (46a). The exhaust passage (46a) passes through the casing (12). The exhaust valve (46b) is provided inside the exhaust passage (46a). The exhaust valve (46b) is an electromagnetic valve which is switched between an open state where the flow of the air in the exhaust passage (46a) is allowed, and a closed state where the flow of the air in the exhaust passage (46a) is blocked. The control unit (55) controls an opening/closing operation of the exhaust valve (46b).

When the control unit (55) opens the exhaust valve (46b) during rotation of the internal fans (26), an exhaust operation in which air (inside air) in the internal storage space (S2) communicating with the internal space of the container is exhausted to the outside of the container is performed.

Specifically, when the internal fans (26) are rotating, the pressure of the secondary space (S22) on the blowout side becomes higher than the pressure of the external space of the container (i.e., the atmospheric pressure). Thus, when the exhaust valve (46b) is open, the air (inside air) in the internal storage space (S2) communicating with the internal space is discharged to the external space of the container via the exhaust passage (46a) due to the pressure difference between the ends of the exhaust passage (46a) (the pressure difference between the external space of the container and the secondary space (S22)).

<Circuit Configuration of Sensor Unit>

As illustrated in FIGS. 2 and 4, the sensor unit (50) is provided in the secondary space (S22) on the blowout side of the internal fans (26) in the internal storage space (S2). The sensor unit (50) includes an oxygen sensor (51), a carbon dioxide sensor (52), a membrane filter (54), a first connection pipe (56), and an exhaust pipe (57).

The oxygen sensor (51) is, for example, a galvanic cell-type sensor. The carbon dioxide sensor (52) may be, for example, a non-dispersive infrared sensor (NDOR). The first connection pipe (56) connects between the oxygen sensor (51) and the carbon dioxide sensor (52). One end of the exhaust pipe (57) is connected to the carbon dioxide sensor (52), and the other end of the exhaust pipe (57) opens in the vicinity of the suction ports of the internal fans (26). The oxygen sensor (51) has a suction port for taking air around the oxygen sensor (51) thereinto, and the suction port is provided with the membrane filter (54).

The secondary and primary spaces (S22) and (S21) of the internal storage space (S2) communicate with each other via a communication passage (58) formed by the membrane filter (54), the oxygen sensor (51), the first connection pipe (56), the carbon dioxide sensor (52), and the exhaust pipe (57). During the operation of the internal fans (26), the pressure of the primary space (S21) becomes lower than the pressure of the secondary space (S22). Due to this pressure difference, the inside air in the container body (2) flows from the secondary space (S22) to the primary space (S21) in the communication passage (58) to which the oxygen sensor (51) and the carbon dioxide sensor (52) are connected. Thus, during the operation of the internal fans (26), the inside air sequentially flows through the oxygen sensor (51) and the carbon dioxide sensor (52), and then the oxygen concentration of the air is measured by the oxygen sensor (51), and the carbon dioxide concentration of the air is measured by the carbon dioxide sensor (52).

The air circuit (3) is provided with a sensor circuit (80) for performing a supply air measurement operation to be described later in which the concentration of the nitrogen-enriched air produced by the first and second adsorption columns (34, 35) is measured using an oxygen sensor (the sensor disclosed herein) (51). The sensor circuit (80) includes a branch pipe (81) and a gas concentration measurement on-off valve (82), and allows part of air flowing through the supply passage (44) to be diverged toward the oxygen sensor (51). The branch pipe (81) is provided with a branch on-off valve (82).

One end of the branch pipe (81) is connected to the supply passage (44), and the other end of the branch pipe (81) is connected to the oxygen sensor (51). The branch pipe (81) is branched from the supply passage (44) in the unit case (36), and communicates with the internal space. The branch pipe (81) is provided with a check valve (64) at the other end portion thereof (inner portion of the container). The check valve (64) allows the flow of the air from one end to the other end of the branch pipe (81) and prevents backflow of the air.

The branch on-off valve (82) is provided in the unit case (36). The branch on-off valve (82) is an electromagnetic valve which switches between an open state where the flow of air in the branch pipe (81) is allowed, and a closed state where the flow of the air in the branch pipe (81) is blocked. The control unit (55) controls an opening/closing operation of the branch on-off valve (82).

When the supply air measurement operation is performed during the stop of operation of the internal fans (26), the nitrogen-enriched air produced in the gas supply unit (30) is guided to the oxygen sensor (51) via the branch pipe (81), and the oxygen concentration of the nitrogen-enriched air is measured by the oxygen sensor (51).

The oxygen sensor (51) is calibrated by introducing outside air therein at predetermined timings. During the calibration of the oxygen sensor (51), outside air compressed in the air pump (31) bypasses the first and second adsorption columns (34, 35), passes through the branch pipe (81), and is introduced into the oxygen sensor (51).

In order to introduce outside air into the oxygen sensor (51), the air circuit (3) has a first passage (75) (the outside air passage (41) and the pressurization passage (42)) for introducing outside air into the first and second adsorption columns (34, 35) using the air pump (31), and a second passage (76) (the bypass passage (47) and the branch pipe (81)) branched from the first passage (41, 42) between the air pump (31) and the first and second adsorption column (34, 35) and communicating with the oxygen sensor (51). The second passage (76) is provided with a gas-liquid separator (85) as a moisture removal portion (84) for removing moisture in the air introduced into the oxygen sensor (51). A drain pipe (77) which is a third passage through which the moisture separated from the air is drained is connected to the gas-liquid separator (85).

A circuit configuration in the case where inside air is directly taken into the sensor unit (50) to perform detection is described above. Next, the arrangement and the structure in the case where an oxygen sensor (51) and a carbon dioxide sensor (52) are provided in a sensor box (90) will be described.

(Arrangement and Structure of Sensor Unit)

Figure 8:
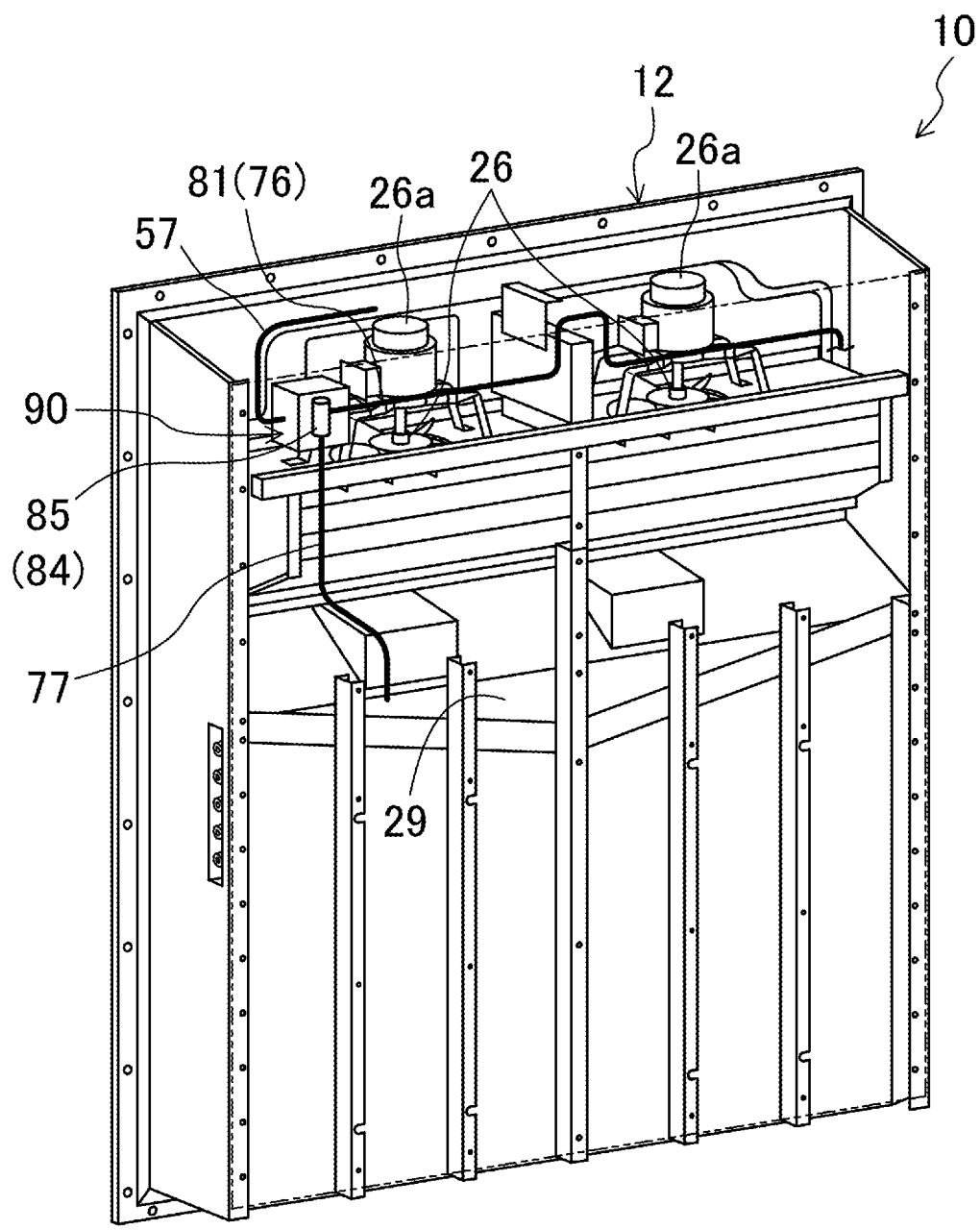
FIG. 8 is a perspective view of a rear side of a casing of the refrigeration apparatus for transport, which illustrates arrangement of a sensor unit.
Figure 9:
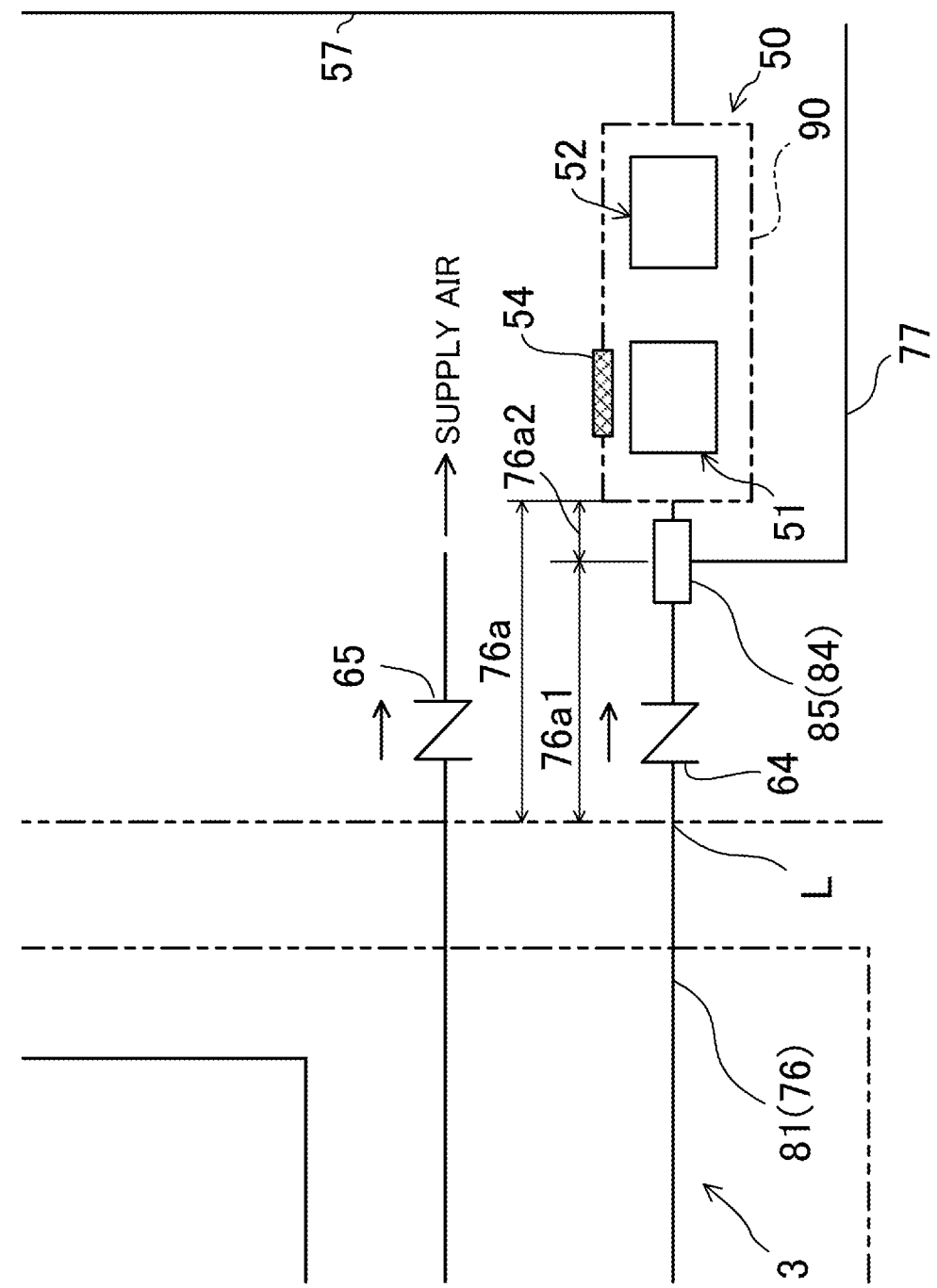
FIG. 9 is a partially enlarged view of FIG. 4.
Figure 10:
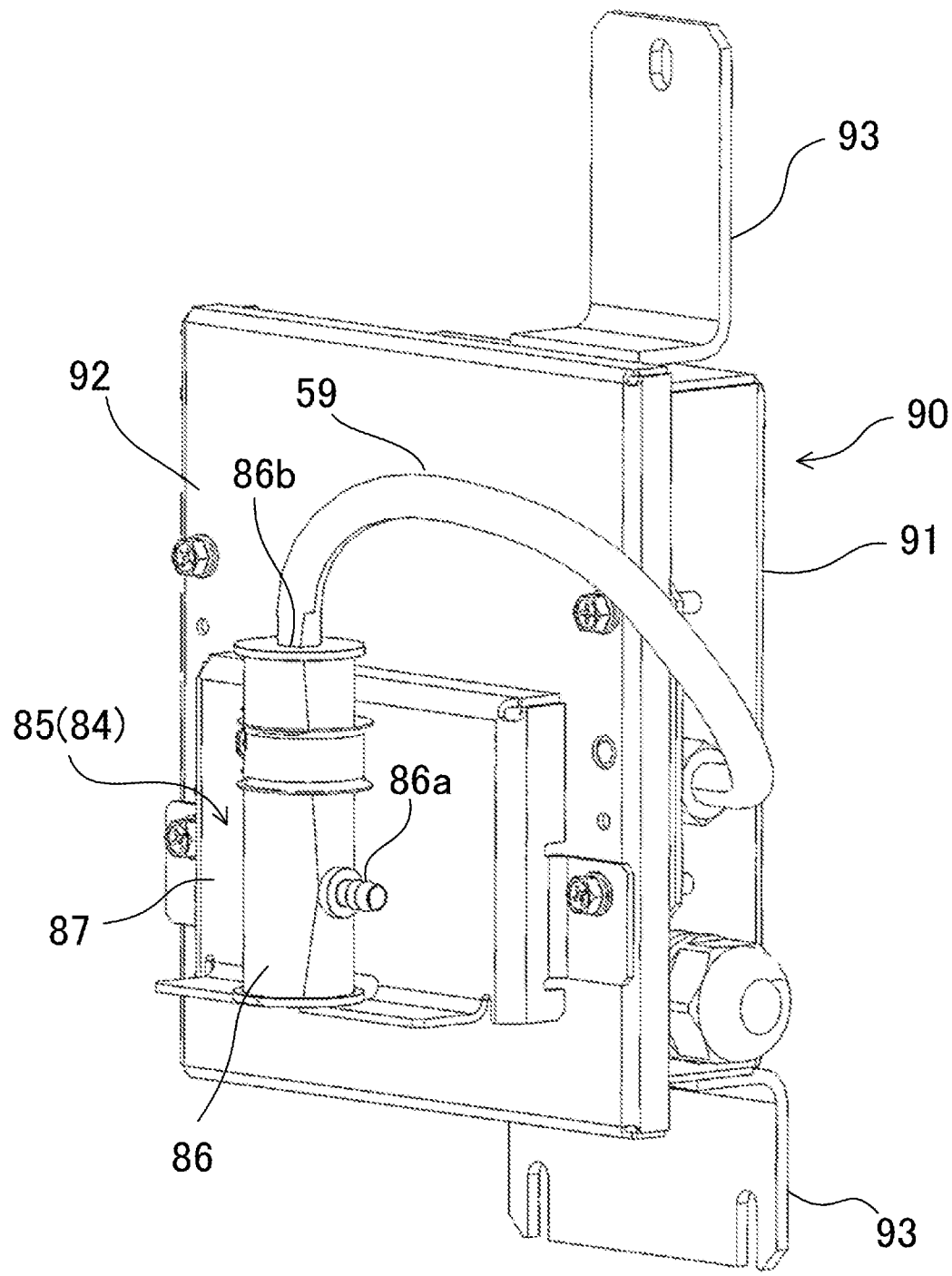
FIG. 10 is a perspective view of the sensor unit.
Figure 11:
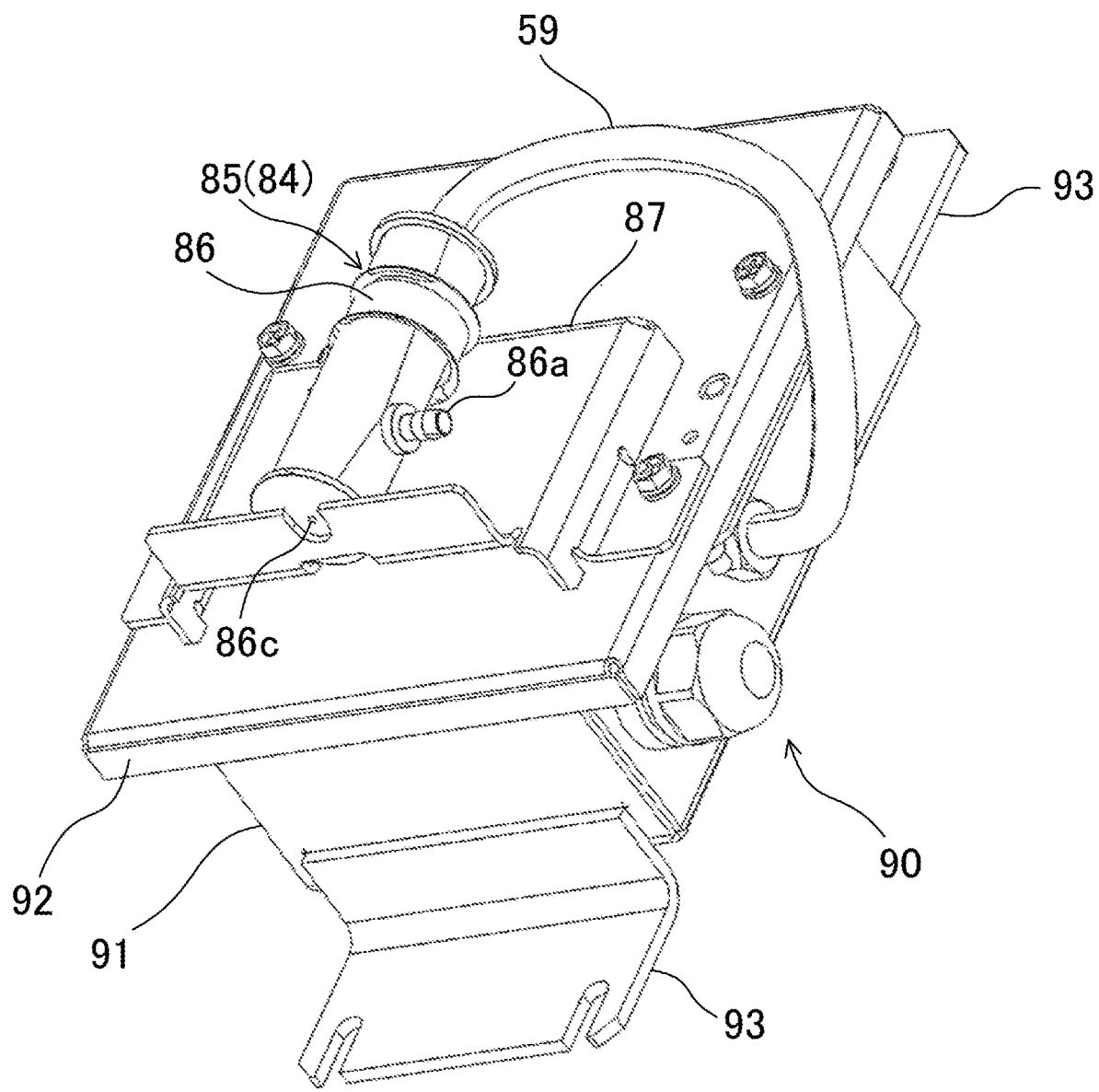
FIG. 11 is a perspective view of the sensor unit viewed from below.

FIG. 8 is a perspective view of a rear side of the casing (12) of the refrigeration apparatus (10) for transport, which shows arrangement of the sensor box (90). FIG. 9 is a partially enlarged view in the case of including the sensor box (90) in FIG. 4, FIG. 10 is a perspective view of the sensor box (90), and FIG. 11 is a perspective view of the sensor box (90) viewed from below.

The sensor unit (50) includes the sensor box (90). The oxygen sensor (51) and carbon dioxide sensor (52) are housed in the sensor box (90). If the sensor unit (50) includes a sensor box (90), the sensor unit (50) further includes an oxygen sensor (51), a carbon dioxide sensor (52), a membrane filter (54), and an exhaust pipe (57) as illustrated in FIG. 9. The sensor box (90) has a suction port (not shown) for intake of air around the sensor box (90) thereinto. The suction port is provided in the surface facing the surface to which the gas-liquid separator (85) is fixed in the sensor box (90) in FIGS. 10 and 11.

The membrane filter (54) is provided at the suction port of the sensor box (90). One end of the exhaust pipe (57) is connected to the sensor box (90). Air is taken through the suction port, passes through the inside of the sensor box (90), and is exhausted through the exhaust pipe (57). The branch pipe (81) is connected to the sensor box (90), and introduces the air. Other configuration is the same as or similar to that of the case where inside air is taken directly into the sensor unit (50).

The gas-liquid separator (85) is disposed between the sensor box (90) and a junction between the first passage (75) and the second passage (76). A portion between "the junction and the sensor box" includes the junction itself and the sensor box itself. In this embodiment, the gas-liquid separator (85) is fixed to the sensor box (90) as illustrated in FIGS. 8 to 11.

In FIG. 8, the branch pipe (81), which is a portion of the second passage (76), is connected to the gas-liquid separator (85) fixed to the sensor box (90). The drain pipe (77) connected to the gas-liquid separator (85) extends downward from the gas-liquid separator (85) so that water is drained to a drain pan (29) provided for the casing (12) to receive drain water produced in the refrigeration apparatus (10) for transport. The exhaust pipe (57) extends from the sensor box (90) and opens on the suction port side of the internal fans (26).

The second passage (76) includes a first portion (76a) disposed inside the internal space. The gas-liquid separator (85) is disposed in the first portion (76a) and is located on the internal space side, not the external space side. The gas-liquid separator (85) is fixed to the sensor box (90) and thus is located closer to the sensor box (90) than the position (L) where the first portion (76a) of the second passage (76) crosses the internal space (a position where air passing through the first portion (76a) flows into the container) is. In other words, in the first portion (76a) of the second passage (76), the length from the position (L) where the first portion (76a) crosses the internal space to a portion (76a1) of the gas-liquid separator (85) is larger than the length of a portion (76a2) from the gas-liquid separator (85) to the sensor box (90). Thus, moisture in the air flowing through the second passage (76) is removed in the first portion (76a) in the vicinity of the oxygen sensor (51).

Figure 12:
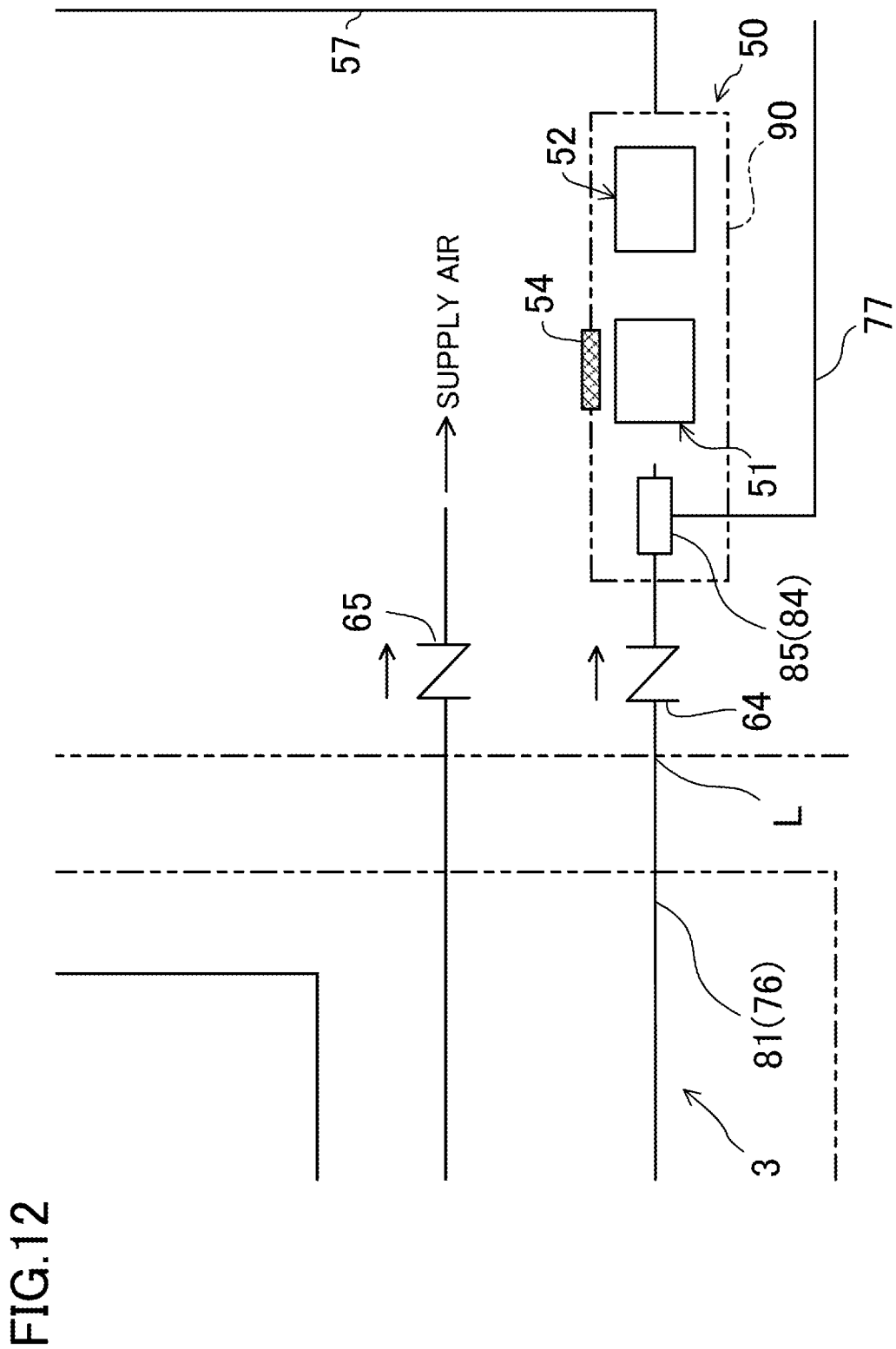
FIG. 12 illustrates a variation of the first embodiment.

As illustrated in FIGS. 11 and 12, the gas-liquid separator (85) includes a cylindrical case (86). The case (86) of the gas-liquid separator (85) has an inflow port (86a) into which air flows, an outflow port (86b) from which air, where (portion of) moisture has been removed, flows out, and a drain port (86c) through which the moisture separated from the air is drained.

The drain port (86c) is provided in a lower portion of the case (86). The drain port (86c) is a pore having a diameter of 1 mm or more to 3 mm or less. One end of the drain pipe (77) is connected to the drain port (86c), the lower end of the drain pipe (77) opens in the vicinity of the drain pan (29), and the moisture is drained into the drain pan (29). In FIGS. 11 and 12, the second passage (76) (the branch pipe (81)) and the drain pipe (77) are omitted. The outflow port (86b) of the gas-liquid separator (85) is connected to a second connection pipe (59), and the second connection pipe (59) communicates with the inside of the sensor box (90).

The sensor box (90) includes a box body (91) and a cover (92). The gas-liquid separator (85) is fixed to the cover (92) of the sensor box (90) by using a bracket (87). The sensor box (90) is fixed to the casing (12) of the refrigeration apparatus (10) for transport by using a bracket (93).

<Control Unit>

The control unit (55) performs control of a concentration adjustment operation in which the oxygen concentration and the carbon dioxide concentration in the inside air in the container body (2) are controlled to desired concentrations. Specifically, the control unit (55) controls the operation of the gas supply unit (30), the exhaust portion (46), and the sensor unit (50) based on measurement results obtained from the oxygen sensor (51) and the carbon dioxide sensor (52) so that the composition (the oxygen concentration and the carbon dioxide concentration) of the inside air in the container body (2) is controlled to a desired target composition (e.g., 5% oxygen and 5% carbon dioxide).

The control unit (55) includes a microcomputer configured to control various components of the CA system (60), and a memory or a disk storing executable control programs. Note that a detailed structure and algorithm of the control unit (55) may be a combination of any kind of hardware and software.

-Operation-
<Operation of Refrigerant Circuit>

In this embodiment, a unit controller (100) shown in FIG. 3 performs a cooling operation of cooling inside air in the container body (2).

During the cooling operation, the unit controller (100) controls the operation of the compressor (21), the expansion valve (23), the external fan (25), and the internal fans (26) such that the temperature of the inside air reaches a desired target temperature based on measurement results provided by a temperature sensor (not shown). The refrigerant circulates in the refrigerant circuit (20) to perform a vapor compression refrigeration cycle. The inside air in the container body (2) guided to the internal storage space (S2) by the internal fans (26) is cooled when passing through the evaporator (24) by the refrigerant flowing through the evaporator (24). The inside air cooled by the evaporator (24) passes through the underfloor path (19a), and is blown again into the container body (2) via the blowout port (18b). Thus, the inside air in the container body (2) is cooled.

<Operation of Gas Supply Unit>
(Gas Production Operation)

The gas supply unit (30) alternately repeats a first operation (see FIG. 4) in which the first adsorption column (34) is pressurized and the second adsorption column (35) is depressurized simultaneously, and a second operation (see FIG. 5) in which the first adsorption column (34) is depressurized and the second adsorption column (35) is pressurized simultaneously every predetermined time so as to produce the nitrogen-enriched air and the oxygen-enriched air. The control unit (55) controls the first and second directional control valves (32) and (33) to perform the switching among these operations.

<<First Operation>>

During the first operation, the control unit (55) switches the first and second directional control valves (32) and (33) to the first state shown in FIG. 4. Thus, the air circuit (3) is set to the first connection state in which the first adsorption column (34) communicates with the discharge port of the first pump mechanism (31a) and is blocked from the suction port of the second pump mechanism (31b), and simultaneously, the second adsorption column (35) communicates with the suction port of the second pump mechanism (31b) and is blocked from the discharge port of the first pump mechanism (31a). In this first connection state, outside air compressed by the first pump mechanism (31a) is supplied to the first adsorption column (34), while the second pump mechanism (31b) sucks nitrogen-enriched air having a higher nitrogen concentration and a lower oxygen concentration than outside air, from the second adsorption column (35).

Specifically, the first pump mechanism (31a) sucks and compresses outside air through the outside air passage (41) and discharges the compressed outside air (compressed air) to the pressurization passage (42). The compressed air discharged to the pressurization passage (42) flows through the pressurization passage (42). Then, the compressed air is supplied to the first adsorption column (34) through the pressurization passage (42).

In this way, the compressed air flows into the first adsorption column (34), and a nitrogen component contained in the compressed air is adsorbed on an adsorbent. During the first operation, the first pump mechanism (31a) supplies the compressed outside air to the first adsorption column (34), in which the adsorbent adsorbs the nitrogen component in the outside air. As a result, oxygen-enriched air having a lower nitrogen concentration and a higher oxygen concentration than the outside air is produced. The oxygen-enriched air flows from the first adsorption column (34) to the oxygen discharge passage (45).

The second pump mechanism (31b) sucks the air from the second adsorption column (35). Simultaneously, the second pump mechanism (31b) also sucks the nitrogen component that has been adsorbed onto the adsorbent in the second adsorption column (35) together with the air, thereby allowing the adsorbent to desorb the nitrogen component. In this way, during the first operation, inside air in the second adsorption column (35) is sucked by the second pump mechanism (31b), and the nitrogen component adsorbed on the adsorbent is desorbed. Accordingly, the nitrogen-enriched air containing the nitrogen component desorbed from the adsorbent and having a higher nitrogen concentration and a lower oxygen concentration than outside air is produced. The nitrogen-enriched air is sucked into the second pump mechanism (31b), compressed, and discharged toward the supply passage (44).

<<Second Operation>>

During the second operation, the control unit (55) switches the first and second directional control valves (32) and (33) to the second state shown in FIG. 5. Thus, the air circuit (3) is set to the second connection state in which the first adsorption column (34) communicates with the suction port of the second pump mechanism (31b) and is blocked from the discharge port of the first pump mechanism (31a), and simultaneously, the second adsorption column (35) communicates with the discharge port of the first pump mechanism (31a) and is blocked from the suction port of the second pump mechanism (31b). In this second connection state, outside air compressed by the first pump mechanism (31a) is supplied to the second adsorption column (35), while the second pump mechanism (31b) sucks the nitrogen-enriched air from the first adsorption column (34).

Specifically, the first pump mechanism (31a) sucks and compresses outside air through the outside air passage (41) and discharges the compressed outside air (compressed air) to the pressurization passage (42). The compressed air discharged to the pressurization passage (42) flows through the pressurization passage (42). Then, similarly to the first operation, the compressed air is supplied to the second adsorption column (35) through the pressurization passage (42).

In this way, the compressed air flows into the second adsorption column (35), and a nitrogen component contained in the compressed air is adsorbed on an adsorbent. During the second operation, the first pump mechanism (31a) supplies the compressed outside air to the second adsorption column (35), in which the adsorbent adsorbs the nitrogen component in the outside air. As a result, oxygen-enriched air having a lower nitrogen concentration and a higher oxygen concentration than the outside air is produced. The oxygen-enriched air flows out from the second adsorption column (35) to the oxygen discharge passage (45).

In contrast, the second pump mechanism (31b) sucks the air from the first adsorption column (34). Simultaneously, the second pump mechanism (31b) also sucks the nitrogen component that has been adsorbed onto the adsorbent in the first adsorption column (34) together with the air, thereby allowing the adsorbent to desorb the nitrogen component. In this way, during the second operation, inside air in the first adsorption column (34) is sucked by the second pump mechanism (31b), and the nitrogen component adsorbed on the adsorbent is desorbed. Accordingly, the nitrogen-enriched air containing the nitrogen component desorbed from the adsorbent and having a higher nitrogen concentration and a lower oxygen concentration than outside air is produced. The nitrogen-enriched air is sucked into the second pump mechanism (31b), compressed, and discharged toward the supply passage (44).

(Gas Supply Operation/Gas Discharge Operation)

The supply-discharge switching mechanism (70) switches the gas supply unit (30) between a gas supply operation in which the nitrogen-enriched air produced in the air circuit (3) is supplied into the container body (2), and a gas discharge operation in which the produced nitrogen-enriched air is not supplied into, but discharged to the outside of, the container body (2) for a predetermined time since the desorption operation was started.

During the gas supply operation, as illustrated in FIGS. 4 and 5, the control unit (55) closes the exhaust on-off valve (72), and opens the supply on-off valve (73). As a result, the nitrogen-enriched air produced alternately in the first and second adsorption columns (34) and (35) is supplied into the container body (2) through the supply passage (44), and the oxygen-enriched air is discharged to the outside of the container body (2) through the oxygen discharge passage (45).

Although not shown in the drawings, during the gas discharge operation, the control unit (55) opens the exhaust on-off valve (72), and closes the supply on-off valve (73). As a result, the nitrogen-enriched air produced alternately in the first and second adsorption columns (34) and (35) and discharged to the supply passage (44) flows from the exhaust connection passage (71) into the oxygen discharge passage (45), and is then discharged to the outside of the container together with the oxygen-enriched air flowing through the oxygen discharge passage (45).

(Outside Air Introduction Operation)

In this embodiment, an outside air introduction operation of introducing outside air into the container body (2) can also be performed. In the outside air introduction operation shown in FIG. 6, the first directional control valve (32) is placed in the first state, the second directional control valve (33) is placed in the second state, and the bypass on-off valve (48) is open. An air-supply on-off valve (73) is open, and the branch on-off valve (82) is closed. When the air pump (31) is actuated in this state, outside air flows through the outside air introduction passage (40) comprised of the outside air passage (41), a portion of the pressurization passage (42), the bypass passage (47), and a portion of the supply passage (44), indicated by a thick solid line. This is because the passage resistance of the outside air introduction passage (40) is less than the passage resistance of the passage through directional control valves (32, 33) and adsorption columns (34, 35). Then, air having the same composition as the outside air flowing through the outside air introduction passage (40) is pushed into the container body (2).

<Concentration Adjustment Operation of CA System>

In this embodiment, the CA system (60) performs a concentration adjustment operation of adjusting the composition (the oxygen concentration and the carbon dioxide concentration) of inside air in the container body (2) to desired composition (e.g., 5% oxygen and 5% carbon dioxide) by the control unit (55). In the concentration adjustment operation, the operation of the gas supply unit (30) and the exhaust portion (46) is controlled based on measurement results obtained from the oxygen sensor (51) and the carbon dioxide sensor (52) so that the composition of the inside air in the container body (2) is controlled to desired target composition.

During the concentration adjustment operation, the control unit (55) closes the gas concentration measurement on-off valve (82). During the concentration adjustment operation, the control unit (55) communicates with the unit controller (100), which rotates the internal fans (26) of the unit controller (100). As a result, inside air is supplied to the oxygen sensor (51) and the carbon dioxide sensor (52) by the internal fans (26), and the oxygen concentration and the carbon dioxide concentration of the inside air are measured.

During the concentration adjustment operation, the gas supply operation is performed by alternately performing the first operation and the second operation to adjust the oxygen concentration in the container. At this time, the exhaust valve (46b) of the exhaust portion (46) is open, and only the same amount of inside air as the amount of nitrogen-enriched air supplied into the container body (2) by the gas supply operation is discharged. When the oxygen concentration of the inside air decreases to a predetermined value (e.g., 8%), the control unit (55) stops the operation of the gas supply unit (30) to stop the gas supply operation, and closes the exhaust valve (46b) to stop the ejection operation. Since plants (15) breathe in the container body (2), the oxygen concentration of inside air in the container body (2) decreases and eventually reaches a target oxygen concentration of 5%.

An operation of increasing the oxygen concentration in the inside air can be performed by the outside air introduction operation in which the bypass on-off valve (48) is open and outside air sucked into the air pump (31) is supplied to the inside of the container body (2) by bypassing the first and second adsorption columns (34, 35). At this time, since the outside air passes through the cooling portion (40a), the increase in the temperature of the inside air is avoided.

Although details are omitted, the adjustment of the oxygen concentration (and the carbon dioxide concentration) of the inside air can be performed also by appropriately switching the gas supply operation, the gas discharge operation, and the outside air introduction operation.

(Supply Air Measurement Operation)

In this embodiment, a supply air measurement operation of measuring the oxygen concentration of the nitrogen-enriched air produced in the gas supply unit (30) by user's instructions or periodically (e.g., every 10 days) can be performed. The supply air measurement operation is performed upon stop of the internal fans (26) during the gas supply operation such as the concentration adjustment operation or a trial operation.

During the gas supply operation, the control unit (55) opens the branch on-off valve (82), and closes the supply on-off valve (73). Accordingly, the nitrogen-enriched air flowing through the supply passage (44) entirely flows into the branch pipe (81). The nitrogen-enriched air flowing into the branch pipe (81) is introduced into the oxygen sensor (51) to measure the oxygen concentration.

In this way, the oxygen concentration of the nitrogen-enriched air produced in the gas supply unit (30) is measured, so that it can be determined that whether or not the composition (the oxygen concentration and the nitrogen concentration) of the nitrogen concentration produced in the gas supply unit (30) is in a desired state.

(Sensor Calibration Operation)

Figure 7:
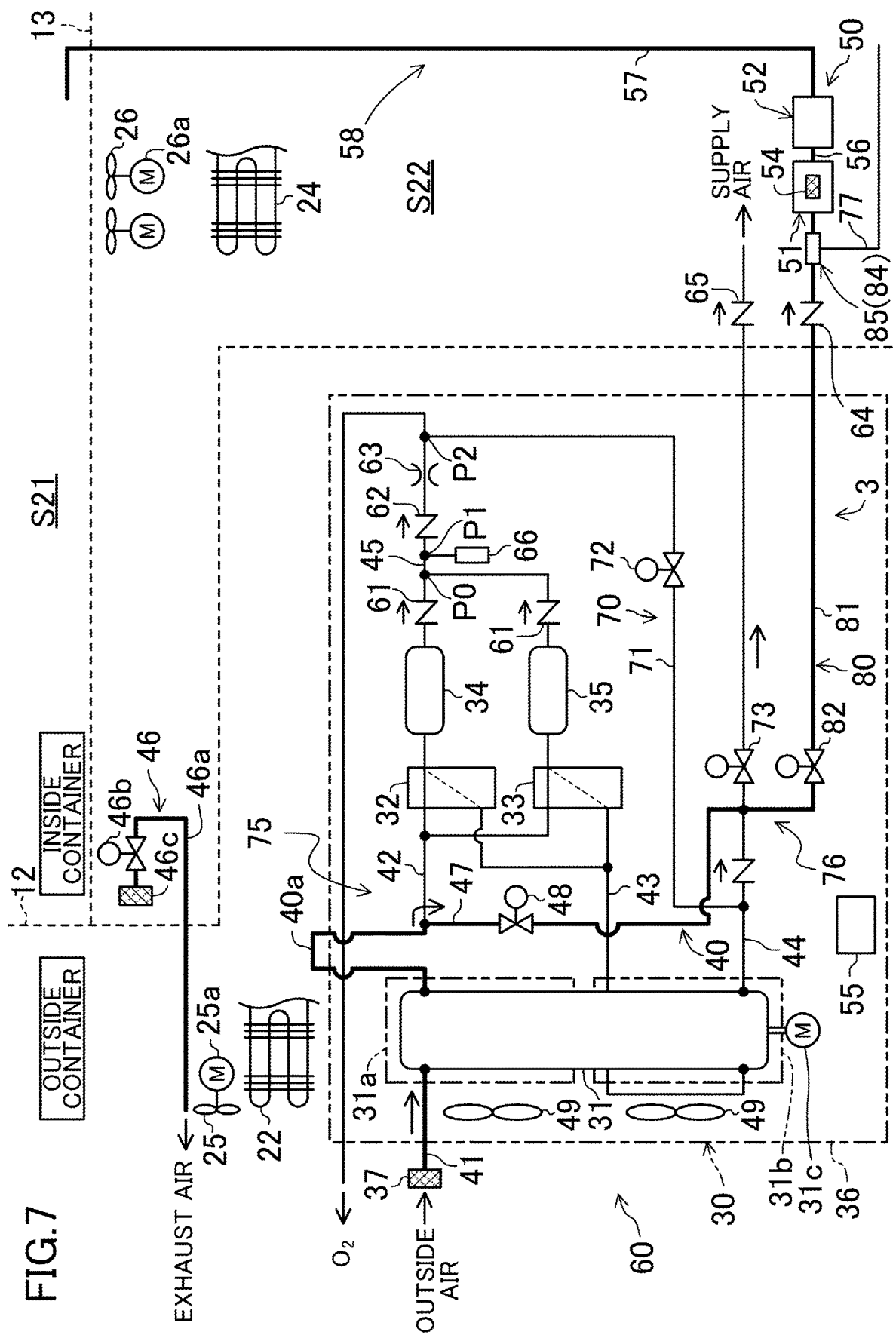
FIG. 7 is a piping system diagram illustrating an air circuit of a CA system of the refrigeration apparatus for transport of FIG. 1, which illustrates a flow of air during a sensor calibration operation.

In this embodiment, a sensor calibration operation of FIG. 7 in which the oxygen sensor (51) is calibrated through introduction of the outside air into the sensor unit (50) can be performed. The sensor calibration operation can be performed in a short time (about 10 minutes) by temporarily stopping concentration adjustment while cooling the inside of the container, and the operation can then return to the concentration adjustment operation.

In the sensor calibration operation, the first directional control valve (32) is placed in the first state, the second directional control valve (33) is placed in the second state, and the bypass on-off valve (48) is open. The air-supply on-off valve (73) is closed, and the branch on-off valve (82) is open. When the air pump (31) is actuated in this state, outside air flows through the first passage (75) and the second passage (76) and is introduced into the sensor unit (50). The oxygen sensor (51) is calibrated so that the detection value indicates the oxygen concentration of the outside air.

During the sensor calibration operation, outside air passes through the gas-liquid separator (85). Thus, outside air from which at least portion of the moisture has been removed comes into contact with the oxygen sensor (51).

-Advantages of First Embodiment-

In the first embodiment, the second passage (76) branched from the first passage (75) is provided with the gas-liquid separator (85). Thus, moisture in the outside air is removed in the second passage (76) when the outside air in the sensor box (90) is introduced into the oxygen sensor (51).

When the first passage (75) is provided with the gas-liquid separator (85), moisture may be produced in the outside air flowing through the second passage (76) after passing through the gas-liquid separator (85), which may cause the oxygen sensor (51) to fail. In this embodiment, since moisture in the outside air can be removed in the second passage (76) instead of the first passage (75), the effect of avoiding contact of the moisture with the oxygen sensor (51) is enhanced, and failure of the oxygen sensor (51) is avoided.

In the first embodiment, the gas-liquid separator (85) is disposed between a portion of the second passage branched from the first passage and the sensor box (90) housing the oxygen sensor (51). Thus, moisture (at least portion thereof) in the outside air is removed in the gas-liquid separator (85) before the outside air flows into the sensor box (90).

The internal space is cooler than the external space, and moisture is produced in the outside air introduced into the oxygen sensor (51) according to the temperature change from the outside of the internal space to the internal space. In the present embodiment, since the gas-liquid separator (85) is arranged in the first portion (76a) of the second passage (76), the moisture in the outside air is removed in the first portion (76a) on the internal space side, i.e., in the vicinity of the oxygen sensor (51). This can further reduce the risk of contact of the oxygen sensor (51) with the moisture.

Specifically, in this embodiment, the length from the inlet portion of the first portion (76a) of the second passage (76) for air into the internal space to the gas-liquid separator (85) is longer than the length from the gas-liquid separator (85) to the sensor box (90), and the gas-liquid separator (85) is placed in the vicinity of the sensor box (90). The moisture in the outside air introduced into the oxygen sensor (51) can be removed near the oxygen sensor (51) even when the gas-liquid separator (85) is placed outside the sensor box (90).

In this embodiment, the drain port (86c) of the gas-liquid separator (85) is provided in a lower portion of the case (86). Thus, outside air flows from an upper inflow port (86a) into the gas-liquid separator (85), and the water flows out from the lower drain port (86c). Thus, the moisture is easily separated from the outside air, and the water separated from the gas-liquid separator (85) is easily drained by its own weight.

Further, in this embodiment, the drain port (86c) is a pore having a diameter of 1 mm or more to 3 mm or less. When the diameter of the drain port (86c) is less than 1 mm, it becomes difficult for water to be drained from the gas-liquid separator (85) due to surface tension. When the amount of moisture flowing out from the gas-liquid separator (85) decreases, it becomes difficult for outside air to be introduced into the gas-liquid separator (85). As a result, introduction of the outside air into the sensor (51) is blocked, and calibration becomes difficult. Thus, the diameter of the drain port (86c) is 1 mm or more in this embodiment. When the diameter of the drain port (86c) is larger than 3 mm, the flow rate of the outside air flowing out from the drain port (86c) becomes large, and it becomes difficult for the outside air to be introduced into the oxygen sensor (51) in the sensor box (90). When the flow rate of the outside air flowing into the sensor box (90) decreases, it becomes difficult for the oxygen concentration in the sensor box (90) to change from the concentration in the container to the concentration of the outside air, which increases the time required to calibrate the oxygen sensor (51). Thus, the diameter of the drain port (86c) is 3 mm or less in this embodiment. When the drain port (86c) has a diameter of 1 mm or more to 3 mm or less, the moisture in an amount suitable for calibration of the oxygen sensor (51) can be drained in this embodiment.

In this embodiment, the gas-liquid separator (85) is fixed to the sensor box (90) housed inside the oxygen sensor (51). With such a configuration, the moisture in the outside air introduced into the oxygen sensor (51) can be removed in the vicinity of the oxygen sensor (51) outside the sensor box (90); thus, the configuration can be simplified.

In this embodiment, the moisture in the outside air separated in the gas-liquid separator (85) is drained in the drain pan (29) of the refrigeration apparatus (10) for transport. With such a configuration, the drain pan (29) originally provided in the refrigeration apparatus (10) for transport can be used, and a dedicated moisture drain structure does not have to be provided.

This can simplify the configuration of the air composition adjustment device (60).

-Variations of First Embodiment- (First Variation)

The gas-liquid separator (85) may be disposed inside the sensor box (90) as illustrated in FIG. 12, instead of outside the sensor box (90). Further, instead of the gas-liquid separator (85), a filter for capturing moisture may be disposed in the sensor box (90) as a moisture removal portion (84).

In this variation, moisture in the outside air is removed inside the sensor box (90). Thus, in this variation, the moisture in the outside air can be removed at a position closer to the oxygen sensor (51) than when the moisture removal portion (84) is disposed outside the sensor box (90). As a result, substantially no moisture is produced in the outside air after passing through the gas-liquid separator (85), and the effect of avoiding contact of moisture with the oxygen sensor (51) can be further enhanced.

(Second Variation)

In the first embodiment, the inflow port (86a) of the gas-liquid separator (85) is provided in a side portion of the case (86), and the outflow port (86b) is provided in an upper portion of the case (86). Although not shown in the drawings, the inflow port (86a) may be provided in an upper portion of the case (86), and the outflow port (86b) may be provided in a side portion of the case (86).

Second Embodiment

The second embodiment is an example where a portion of the branch pipe (81) is used as the moisture removal portion (84) without using the gas-liquid separator (85) of the first embodiment.

Figure 13:
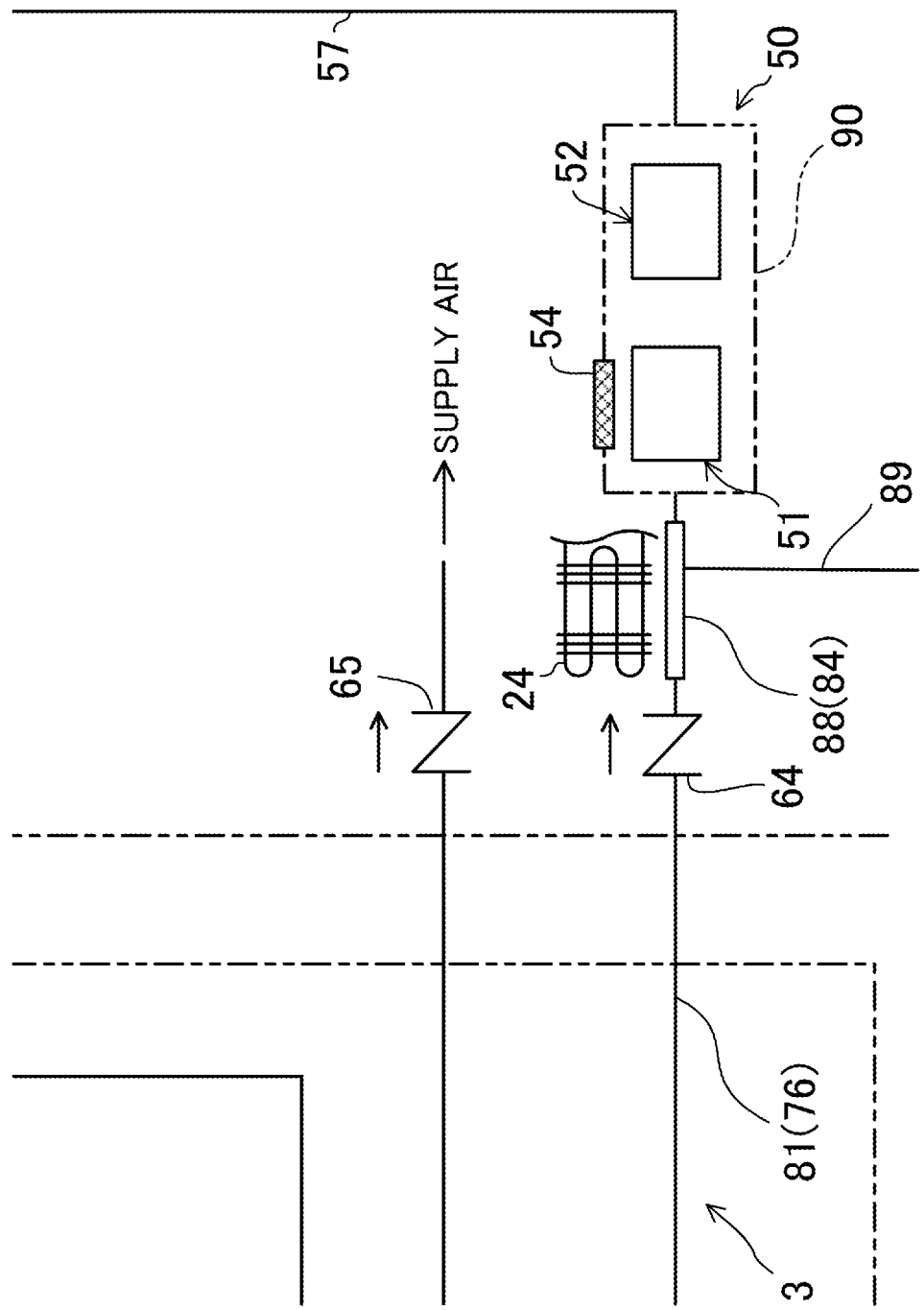
FIG. 13 is a schematic view of a moisture removal portion of a second embodiment.

FIG. 13 is a schematic view of the moisture removal portion (84) of the second embodiment. The moisture removal portion (84) is a heat exchange portion (88), which is a portion of the branch pipe (81) in the second passage (76). The heat exchange portion (88) is provided to cool air flowing through the branch pipe (81) of the second passage (76). A drainage (89) extending downward from the second passage (76) is connected to the heat exchange portion (88). The drainage (89) may be connected to the second passage (76) at a position downstream of the heat exchange portion (88) in an airflow direction. The drainage (89) is configured to drain water to the drain pan (29) in the same manner as the drain pipe (77).

Figure 14:
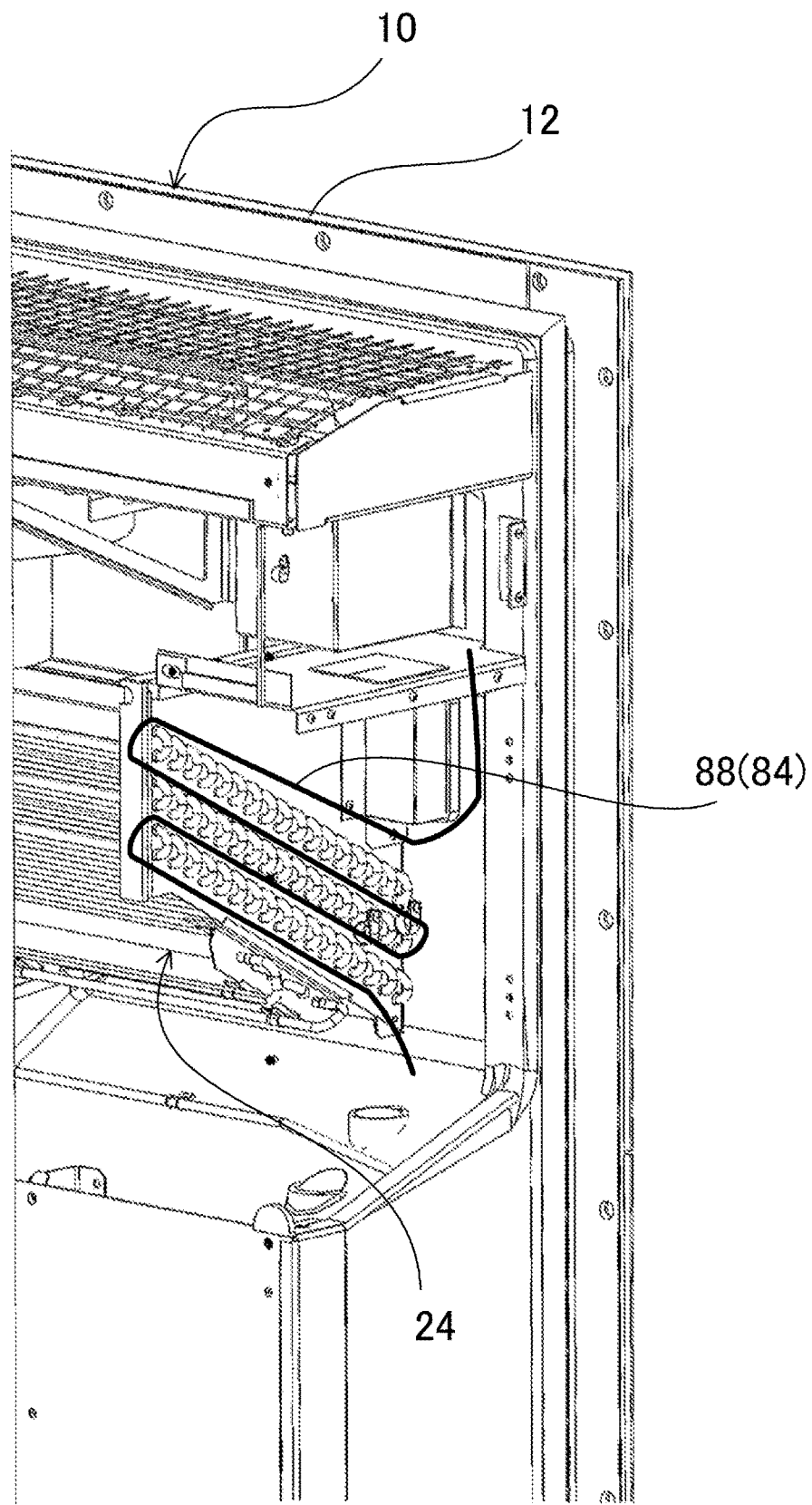
FIG. 14 is a perspective view of the state where a portion of the casing in the refrigeration apparatus for transport according to the second embodiment is removed, which illustrates arrangement of the heat-exchange portion.

FIG. 14 is a perspective view of the state where a portion of the casing (12) in the refrigeration apparatus (10) for transport is removed and shows detailed arrangement of the heat exchange portion (88). As illustrated in FIG. 14, the second passage (76) is disposed to be in contact with the evaporator (24) of the refrigeration apparatus (10) for transport, and a portion along the evaporator (24) is formed as a heat exchange portion (88). The heat exchange portion (88) is specifically disposed along a heat transfer tube of the evaporator (24).

The other configuration of the second embodiment is common to that of the first embodiment. Thus, the explanation of the other configuration is omitted.

In the second embodiment, the refrigerant flowing inside the heat transfer tube in the evaporator (24) absorbs heat from air around the evaporator (24) to cool the air. At this time, the heat exchange portion (88) disposed along the heat transfer tube is also cooled. Thus, outside air flowing inside the heat exchange portion (88) is also cooled, whereby the moisture is turned into a liquid state in the heat exchange portion (88). The drainage (89) extending downward is connected to the branch pipe (81). Thus, the water produced is drained through the drainage (89) by its own weight.

According to the second embodiment, outside air flowing inside the heat exchange portion (88) is cooled by the refrigerant flowing through the evaporator (24), and moisture produced is drained through the drainage (89). As a result, outside air introduced into the oxygen sensor (51) becomes air from which (portion of) moisture has been removed, and the contact of the moisture with the oxygen sensor (51) is avoided. Thus, a failure of the oxygen sensor (51) due to the moisture can be reduced.

-Variation of Second Embodiment-
(First Variation)

Figure 15:
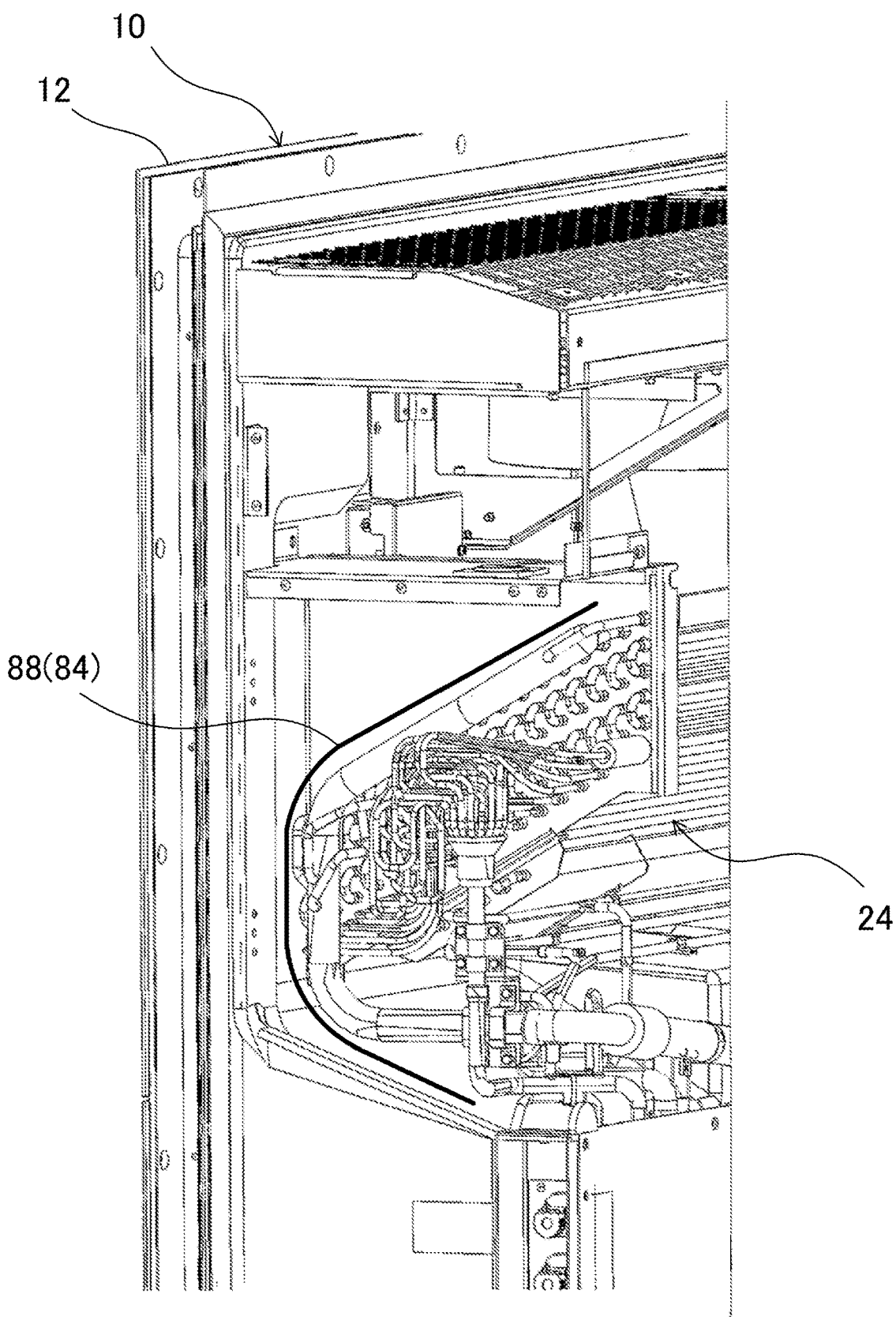
FIG. 15 is an enlarged perspective view of the state where a portion of the casing in the refrigeration apparatus for transport according to a first variation of the second embodiment is removed, which illustrates a variation of the arrangement of the heat-exchange portion.

FIG. 15 shows a first variation of the second embodiment. The first variation differs from the second embodiment of FIG. 14 in the arrangement of the heat exchange portion (88).

In the first variation, the heat exchange portion (88) is disposed along a header pipe connected to the heat transfer tube of the evaporator (24). With such a configuration, outside air flowing through the heat exchange portion (88) is cooled in the evaporator (24), and the moisture produced is drained through the drainage (89). Thus, outside air introduced into the oxygen sensor (51) becomes air from which (portion of) moisture has been removed. Thus, a failure of the oxygen sensor (51) is avoided.

The heat exchange portion (88) may be disposed along a tube sheet to which the heat transfer tube is fixed, instead of along the header pipe.

(Second Variation)

Figure 16:
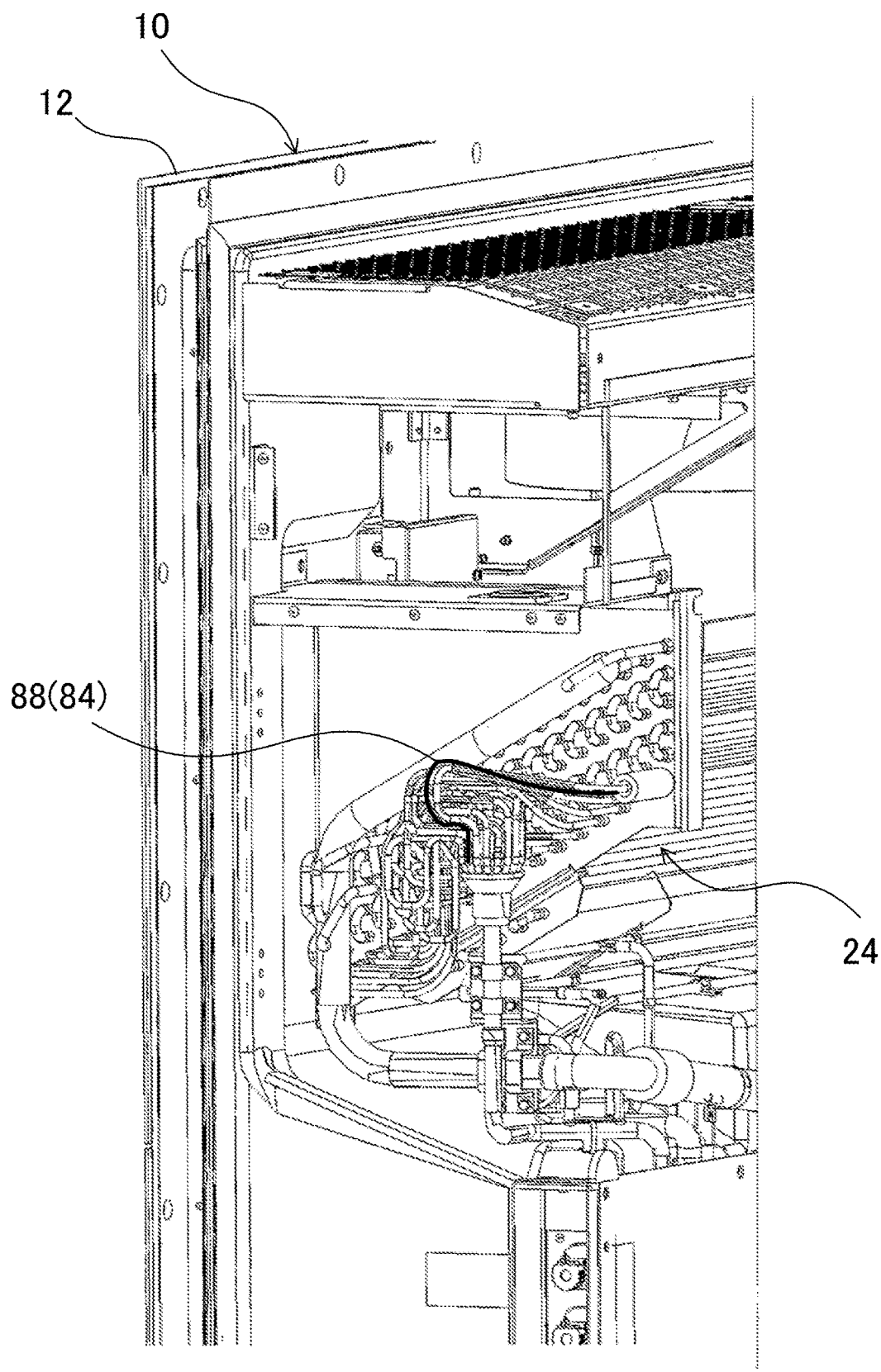
FIG. 16 is an enlarged perspective view of the state where a portion of the casing in the refrigeration apparatus for transport according to a second variation of the second embodiment is removed, which illustrates a variation of the arrangement of the heat-exchange portion.

FIG. 16 shows a second variation of the second embodiment. The variation differs from the second embodiment of FIG. 14 and the first variation of FIG. 15 in arrangement of the heat exchange portion (88).

In the second variation, the heat exchange portion (88) is disposed along a flow divider pipe of the evaporator (24). With such a configuration, outside air flowing through the heat exchange portion (88) is cooled in the evaporator (24), and the moisture produced is drained through the drainage (89). Thus, outside air introduced into the oxygen sensor (51) becomes air from which (portion of) moisture has been removed. Thus, a failure of the oxygen sensor (51) is avoided.

<Third Variation>

Figure 17:
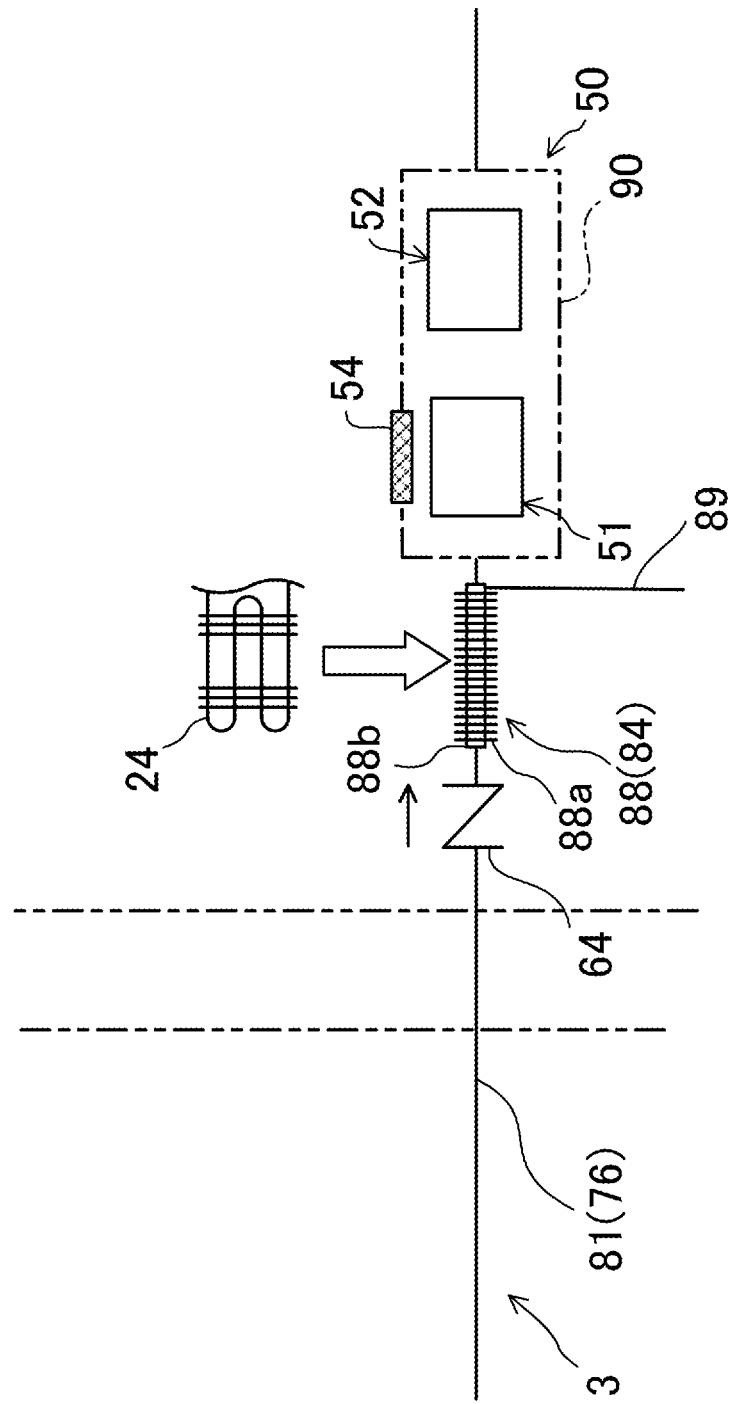
FIG. 17 is a schematic view of a moisture removal portion according to a third variation of the second embodiment.

FIG. 17 shows a third variation of the second embodiment. The variation differs from the configurations shown in FIGS. 14 to 16 in arrangement of the heat exchange portion (88).

In the third variation, the heat exchange portion (88) includes a pipe (88a) of the second passage (76) (the branch pipe (81)) and a plurality of fins (88b) provided in the pipe (88a). The heat exchange portion (88) is disposed in a secondary space (S22) of an internal storage space (S2), which is a passage through which air cooled in the refrigeration apparatus (10) for transport flows. The heat exchange portion (88) is at least a portion of the second passage (76) from the portion entering the internal space to the heat exchange portion (88).

In the third variation, air cooled in the evaporator (24) of the refrigeration apparatus (10) for transport passes around the heat exchange portion (88). With such a configuration, outside air flowing inside the heat exchange portion (88) is cooled, and the moisture produced in the outside air is drained through the drainage (89). Thus, outside air introduced into the oxygen sensor (51) becomes air from which (portion of) moisture has been removed. Thus, a failure of the oxygen sensor (51) is avoided. In this configuration, the heat exchange portion (88) is provided with the fins (88b). Thus, outside air is efficiently cooled.

(Fourth Variation)

In the third variation, the heat exchange portion (88) is provided with the fins (88b). However, the fins (88b) do not have to be provided (not shown).

Even with such a configuration, the moisture in the outside air introduced into the oxygen sensor (51) can be reduced compared with the configuration where the heat exchange portion (88), which is the moisture removal portion (84), is disposed in the second passage (76). Thus, a failure of the oxygen sensor (51) can be reduced.

Other Embodiments

The above-described embodiments may be modified as follows.

Figure 18:
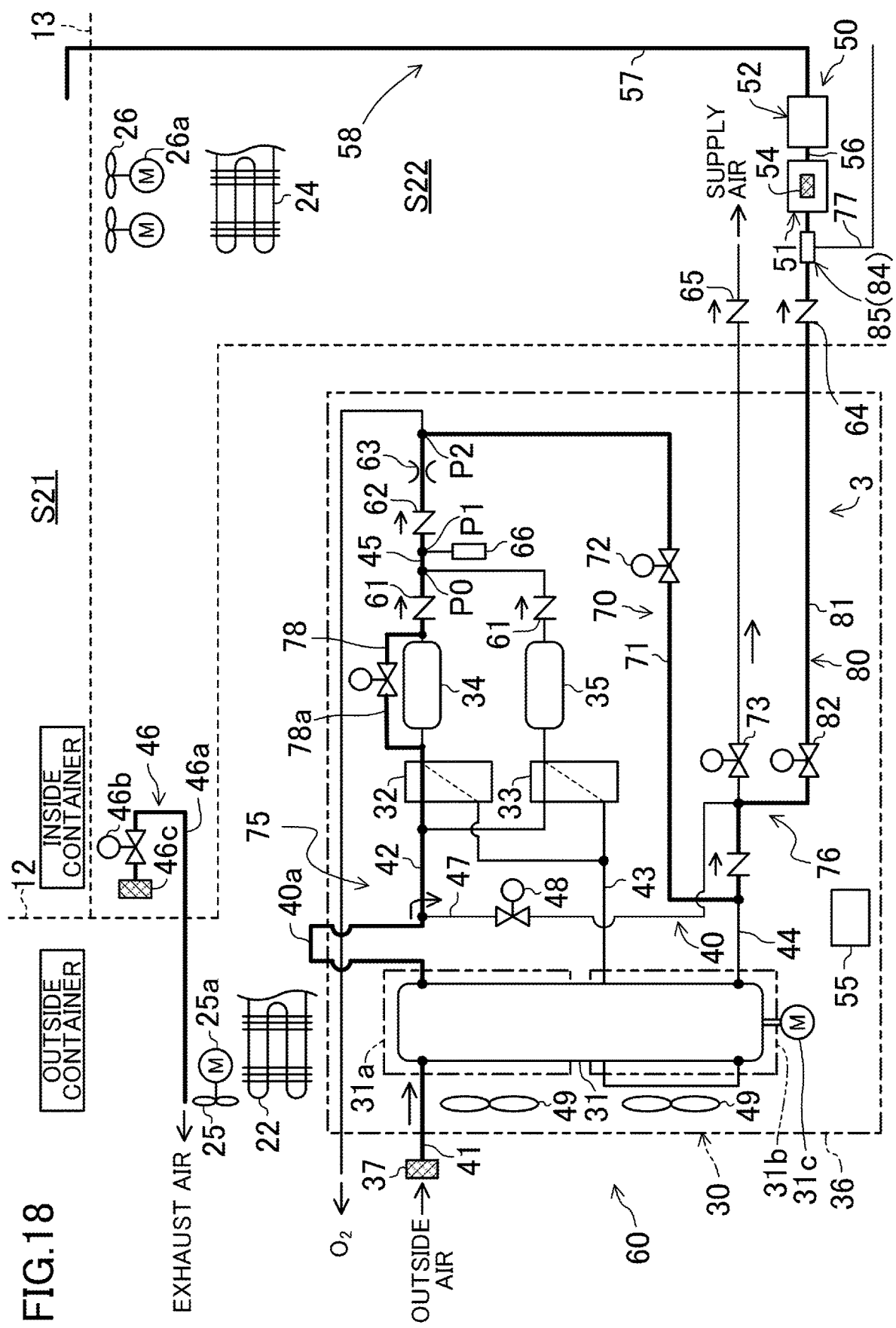
FIG. 18 is a piping system diagram illustrating a configuration of the CA system according to another embodiment.

In the embodiments, the second passage (76) branched from the first passage (75) is comprised of the bypass passage (47) and the branch pipe (81), but other configurations may be employed. For example, as illustrated in FIG. 18, one end of a bypass passage (78) arranged in parallel with the first adsorption column (34) may be connected to the pressurization passage (42), and the other end may be connected to the oxygen discharge passage (45). With such a configuration, outside air flowing through the bypass passage (78) having a bypass on-off valve (78a), the oxygen discharge passage (45), the exhaust connection passage (71), the supply passage (44), and the branch pipe (81) can be introduced into the oxygen sensor (51) in calibration. In this way, the second passage (76) may be a passage which is branched from the first passage (75) and is then merges as long as it is a passage which is branched from the first passage (75) and through which outside air can be introduced into the oxygen sensor (51).

In the embodiments, the oxygen sensor (51) is described as a sensor to be avoided from contacting the moisture. However, the target sensor is not limited to the oxygen sensor (51). The target sensor may be a sensor for measuring concentrations of components in inside air. For example, the target sensor may be a carbon dioxide sensor (52) instead of or in addition to the oxygen sensor (51). The target sensor may also be an ethylene sensor for detecting the ethylene concentration or a leakage detection sensor for detecting leakage of refrigerant into the container. In the configuration in which other sensors are used, if failures of the sensors may occur due to the moisture, the sensor may be target sensors.

In the embodiments, one air pump (31) includes a first pump mechanism (31a) and a second pump mechanism (31b). However, the first pump mechanism (31a) and the second pump mechanism (31b) may be two individual air pumps.

In the embodiments, the conveying unit may be configured using a fan.

In the embodiments, a single adsorption column is used as each of the first adsorption portion and the second adsorption portion to adsorb and desorb nitrogen. However, the number of adsorption columns forming each adsorption portion is not limited to one. For example, each adsorption portion may include three adsorption columns, and a total of six adsorption columns may be used.

The adjuster (34, 35) of the embodiments are not limited to a configuration using an adsorbent such as zeolite, and may be a configuration where a gas separation membrane having a nitrogen permeability and an oxygen (and carbon dioxide) permeability which are different from each other is used to produce nitrogen-enriched air and oxygen-enriched air and composition of the inside air is adjusted by concentrated air thereof.

In the embodiments, an example of applying the CA system (60) according to the present invention to the refrigeration apparatus (10) for transport provided for the container body (2) for marine transport has been described. However, the application of the CA system (60) according to the present invention is not limited thereto. The CA system (60) according to the present invention is applicable for adjustment of the composition of the inside air not only in a container for marine transport, but also in, for example, a container for land transportation, a mere refrigerated warehouse, and a warehouse at room temperatures.

While the embodiments and variations thereof have been described above, it will be understood that various changes in form and details may be made without departing from the spirit and scope of the claims. The foregoing embodiments and variations thereof may be combined and replaced with each other without deteriorating the intended functions of the present disclosure.

INDUSTRIAL APPLICABILITY

As can be seen from the foregoing description, the present disclosure is useful for an air composition adjustment device, a refrigeration apparatus for transport, and a transport container.

EXPLANATION OF REFERENCES

1 Transport Container
2 Container Body
3 Air Circuit
10 Refrigeration Apparatus for Transport (Refrigeration Apparatus)
20 Refrigerant Circuit
21 Compressor (Component)
22 Condenser (Component)
23 Expansion Valve (Component)
24 Evaporator (Component)
29 Drain Pan
31 Air Pump (Conveying unit)
34 First Adsorption Column (Adjuster)
35 Second Adsorption Column (Adjuster)
51 Oxygen Sensor (Sensor)
60 Air Composition Adjustment Device (Air Composition Adjuster)
75 First Passage
76 Second Passage
76 First Portion
77 Third Passage
85 Gas-Liquid Separator (Moisture Removal Portion)
86 Case
86a Inflow Port
86b Outflow Port
86c Drain Port
88 Heat Exchange Portion (Moisture Removal Portion)
88a Pipe
88b Fin
89 Drainage
90 Sensor Box

The invention claimed is:

1. An air composition adjustment device comprising:
a conveying unit configured to convey air;
an adjuster configured to adjust composition of the air;
an air circuit configured to introduce the air into the adjuster by the conveying unit and supply the air having adjusted composition to a target space; and
a sensor disposed in the target space and configured to measure the composition of the air, wherein
the air circuit comprises a first passage for introducing first outside air into the adjuster by the conveying unit and a second passage for introducing second outside air which has not passed through the adjuster into the sensor, the second passage being branched from the first passage between the conveying unit and the adjuster, and
the second passage is provided with a moisture removal portion configured to remove moisture in air introduced into the sensor.

2. The air composition adjustment device of claim 1, further comprising:
a sensor box housing the sensor therein, wherein
the moisture removal portion is disposed between the sensor box and a branch portion of the second passage from the first passage.

3. The air composition adjustment device of claim 1, further comprising:
a sensor box housing the sensor therein, wherein
the moisture removal portion is disposed in the sensor box.

4. The air composition adjustment device of claim 1, wherein
the second passage includes a first portion disposed inside the target space, and
the moisture removal portion is disposed in the first portion.

5. The air composition adjustment device of claim 1, further comprising:
a sensor box housing the sensor therein, wherein
the second passage includes a first portion disposed inside the target space,
the moisture removal portion is disposed in the first portion, and
a length from an inlet portion of the first portion of the second passage for air into the target space to the moisture removal portion is longer than a length from the moisture removal portion to the sensor box.

6. The air composition adjustment device of claim 4, wherein the conveying unit, the adjuster, the air circuit, and the sensor are configured to adjust composition of air in the target space cooled in a refrigeration apparatus, and at least a portion from an inlet portion of the first portion of the second passage for air into the target space to the moisture removal portion is disposed in a passage through which air cooled in the refrigeration apparatus flows.

7. The air composition adjustment device of claim 1, wherein
the moisture removal portion is a gas-liquid separator including a case having an inflow port into which air flows, an outflow port from which gas of the air, where moisture has been separated, flows out, and a drain port from which the moisture separated from the air is drained.

8. The air composition adjustment device of claim 7, wherein
the drain port is provided in a lower portion of the case.

9. The air composition adjustment device of claim 8, wherein
the drain port is a pore having a diameter of 1 mm or more to 3 mm or less.

10. The air composition adjustment device of claim 1, further comprising:
a sensor box housing the sensor therein, wherein
the moisture removal portion is a gas-liquid separator including a case having an inflow port into which air flows, an outflow port from which gas of the air, where moisture has been separated, flows out, and a drain port from which the moisture separated from the air is drained, and
the gas-liquid separator is fixed to the sensor box.

11. The air composition adjustment device of claim 7, wherein the conveying unit, the adjuster, the air circuit, and the sensor are configured to adjust composition of air in the target space cooled in a refrigeration apparatus, a third passage through which moisture separated by the gas-liquid separator is drained is connected to the drain port, and the third passage is configured to drain the moisture into a drain pan that receives drain water produced in the refrigeration apparatus.

12. The air composition adjustment device of claim 1, wherein
the moisture removal portion includes a heat exchange portion configured to cool air flowing through the second passage, and a drainage extending downward from the heat exchange portion of the second passage or a portion of the second passage downstream of the heat exchange portion in an airflow direction.

13. The air composition adjustment device of claim 12, wherein the conveying unit, the adjuster, the air circuit, and the sensor are configured to adjust composition of air in the target space cooled in a refrigeration apparatus, and the heat exchange portion is disposed to be in contact with an evaporator of the refrigerant circuit in the refrigeration apparatus.

14. The air composition adjustment device of claim 12, wherein
the heat exchange portion has a fin provided in a pipe of the second passage.

15. A refrigeration apparatus for transport, the refrigeration apparatus comprising:
components of a refrigerant circuit configured to perform a refrigeration cycle and an air composition adjuster configured to adjust composition of air in a target space,
an evaporator of the refrigerant circuit being configured to cool the air in the target space, wherein
the air composition adjuster is the air composition adjustment device of claim 1.

16. A transport container comprising:
a container body for transporting a fresh item; and a refrigeration apparatus configured to cool inside of the container body as a target space, wherein
the refrigeration apparatus is the refrigeration apparatus for transport of claim 15.

* * * * *